US012617652B2

(12) United States Patent
Taniguchi et al.

(10) Patent No.: US 12,617,652 B2
(45) Date of Patent: May 5, 2026

(54) BUILDING FACILITY VIBRATION MEASUREMENT DEVICE AND MANAGEMENT SYSTEM

(71) Applicants: Mitsubishi Electric Corporation, Tokyo (JP); Mitsubishi Electric Building Solutions Corporation, Tokyo (JP)

(72) Inventors: Takaya Taniguchi, Tokyo (JP); Takuya Hashiguchi, Tokyo (JP); Kiyotaka Watanabe, Tokyo (JP); Yoshiko Ono, Tokyo (JP); Kotaro Watanabe, Tokyo (JP)

(73) Assignees: MITSUBISHI ELECTRIC CORPORATION, Tokyo (JP); MITSUBISHI ELECTRIC BUILDING SOLUTIONS CORPORATION, Tokyo (JP)

( * ) Notice: Subject to any disclaimer, the term of this patent is extended or adjusted under 35 U.S.C. 154(b) by 1022 days.

(21) Appl. No.: 17/763,200

(22) PCT Filed: Sep. 30, 2019

(86) PCT No.: PCT/JP2019/038595
§ 371 (c)(1),
(2) Date: Mar. 24, 2022

(87) PCT Pub. No.: WO2021/064815
PCT Pub. Date: Apr. 8, 2021

(65) Prior Publication Data
US 2022/0348436 A1 Nov. 3, 2022

(51) Int. Cl.
*B66B 1/34* (2006.01)
*B66B 5/12* (2006.01)
(Continued)

(52) U.S. Cl.
CPC .............. *B66B 1/3492* (2013.01); *B66B 5/12* (2013.01); *B66B 7/1215* (2013.01); *G01L 5/042* (2013.01); *G01L 5/047* (2013.01); *G01P 15/00* (2013.01)

(58) Field of Classification Search
CPC ....... B66B 1/3492; B66B 5/12; B66B 7/1215; B66B 7/10; G01L 5/042; G01L 5/047;
(Continued)

(56) References Cited

U.S. PATENT DOCUMENTS

| | | | |
|---|---|---|---|
| 5,731,528 A | 3/1998 | Yamazaki et al. | |
| 6,321,876 B1 | 11/2001 | Kawai et al. | |

FOREIGN PATENT DOCUMENTS

| | | | |
|---|---|---|---|
| CN | 1060135 C | | 1/2001 |
| CN | 102998693 A | * | 3/2013 |

(Continued)

OTHER PUBLICATIONS

Machine translation of JP 2013-095554 (Year: 2025).*
(Continued)

*Primary Examiner* — Topaz L. Elliott
(74) *Attorney, Agent, or Firm* — XSENSUS LLP

(57) ABSTRACT

There is provided a building facility vibration measurement device that can easily ascertain whether specs are sufficient for measurement of vibration of a building facility. A building facility vibration measurement device includes: an acceleration detection unit configured to detect acceleration; an acceleration collection unit configured to collect the acceleration detected by the acceleration detection unit; an accuracy calculation unit configured to calculate detection accuracy of the acceleration from information on the acceleration collected by the acceleration collection unit; and a judgement unit configured to, based on the detection accu-
(Continued)

racy calculated by the accuracy calculation unit, judge whether vibration of a building facility can be measured.

10 Claims, 24 Drawing Sheets

(51) Int. Cl.

| | | |
|---|---|---|
| *B66B 7/12* | (2006.01) | |
| *G01L 5/04* | (2006.01) | |
| *G01P 15/00* | (2006.01) | |

(58) Field of Classification Search
CPC ........... G01P 15/00; G01P 21/00; G01H 1/06; G01M 7/00
See application file for complete search history.

(56) References Cited

FOREIGN PATENT DOCUMENTS

| | | | | | |
|---|---|---|---|---|---|
| CN | 203164426 U | * | 8/2013 | | |
| CN | 103359565 A | | 10/2013 | | |
| CN | 112693985 A | * | 4/2021 | ............... | B66B 5/02 |
| DE | 102023122286 B3 | * | 9/2024 | ............. | G01P 21/00 |
| JP | 3188833 B2 | | 7/2001 | | |
| JP | 2013-95554 A | | 5/2013 | | |
| JP | 5418307 B2 | | 2/2014 | | |
| WO | 2019/167245 A1 | | 9/2019 | | |

OTHER PUBLICATIONS

International Search Report mailed on Dec. 24, 2019, received for PCT Application PCT/JP2019/038595, Filed on Sep. 30, 2019, 5 pages including English Translation.

First Office Action mailed on Feb. 4, 2021, received for TW Application 109128210, 11 pages including Partial English Translation.

Second Office Action mailed on Jun. 9, 2021, received for TW Application 109128210, 11 pages including Partial English Translation.

Office Action dated Feb. 4, 2023 issued in the corresponding Chinese Patent application No. 201980100661.2 and Computer-generated English translation thereof,16 pages.

Indian Office Action issued May 5, 2022, in Indian Application No. 202247011542.

* cited by examiner

*FIG.10A*        *FIG.10B*
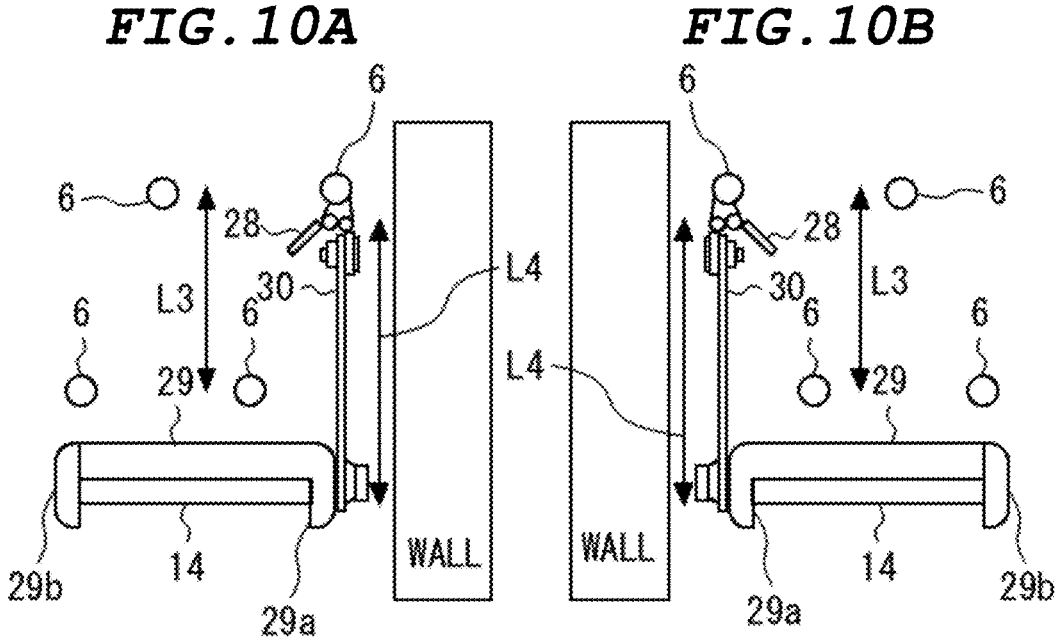
*FIG.11*
$$R_3 > R_2 > R_1$$
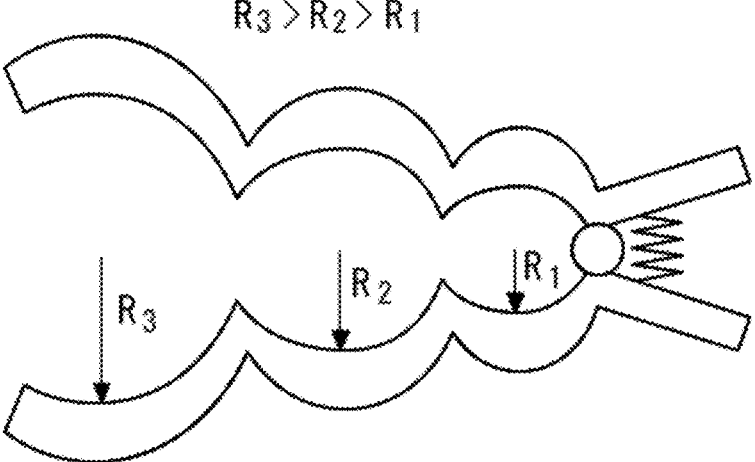

FIG. 23

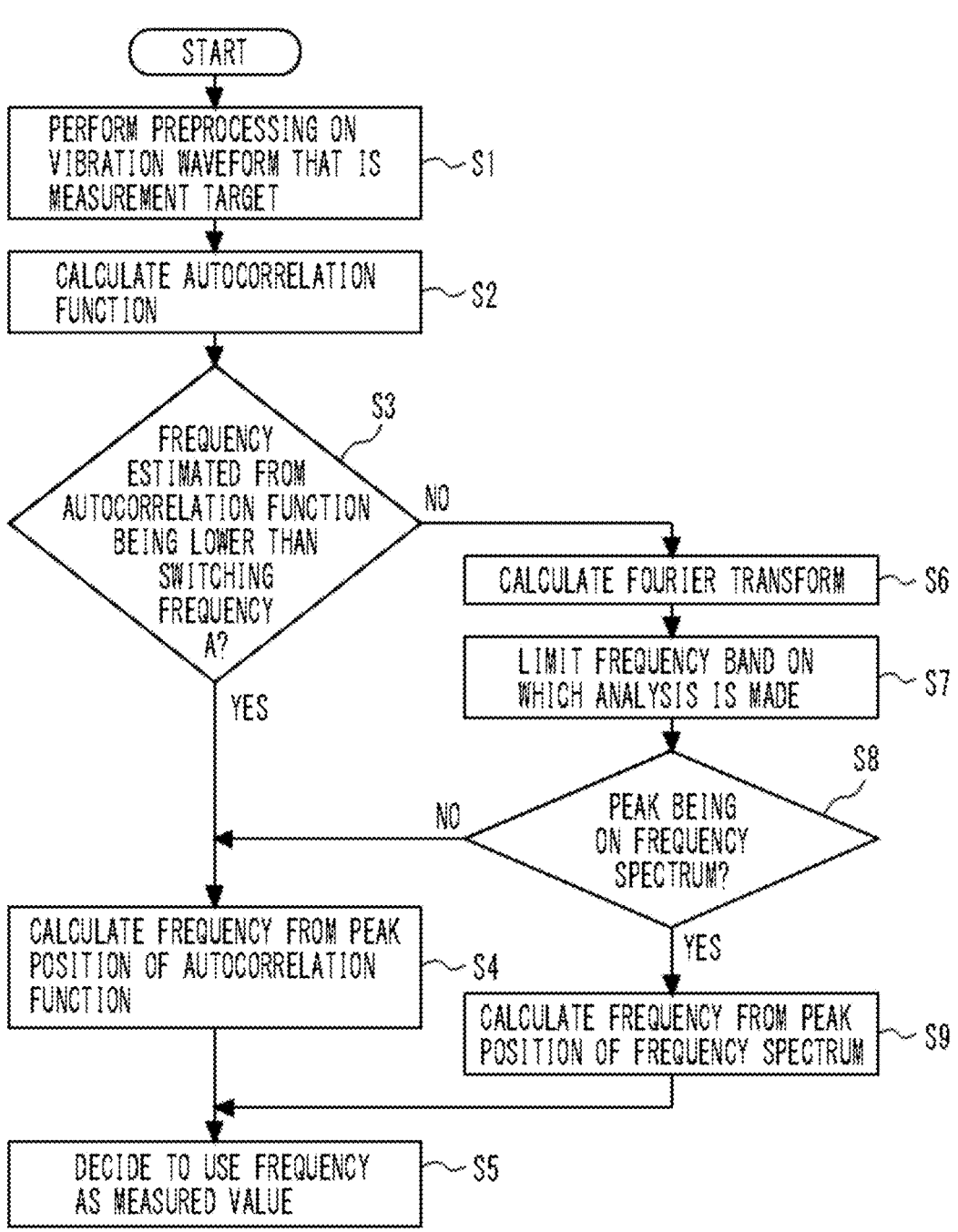

START

PERFORM PREPROCESSING ON VIBRATION WAVEFORM THAT IS MEASUREMENT TARGET ～S1

CALCULATE AUTOCORRELATION FUNCTION ～S2

FREQUENCY ESTIMATED FROM AUTOCORRELATION FUNCTION BEING LOWER THAN SWITCHING FREQUENCY A? S3

NO

CALCULATE FOURIER TRANSFORM ～S6

LIMIT FREQUENCY BAND ON WHICH ANALYSIS IS MADE ～S7

PEAK BEING ON FREQUENCY SPECTRUM? S8

NO

YES

YES

CALCULATE FREQUENCY FROM PEAK POSITION OF AUTOCORRELATION FUNCTION ～S4

CALCULATE FREQUENCY FROM PEAK POSITION OF FREQUENCY SPECTRUM ～S9

DECIDE TO USE FREQUENCY AS MEASURED VALUE ～S5

Figure 28:
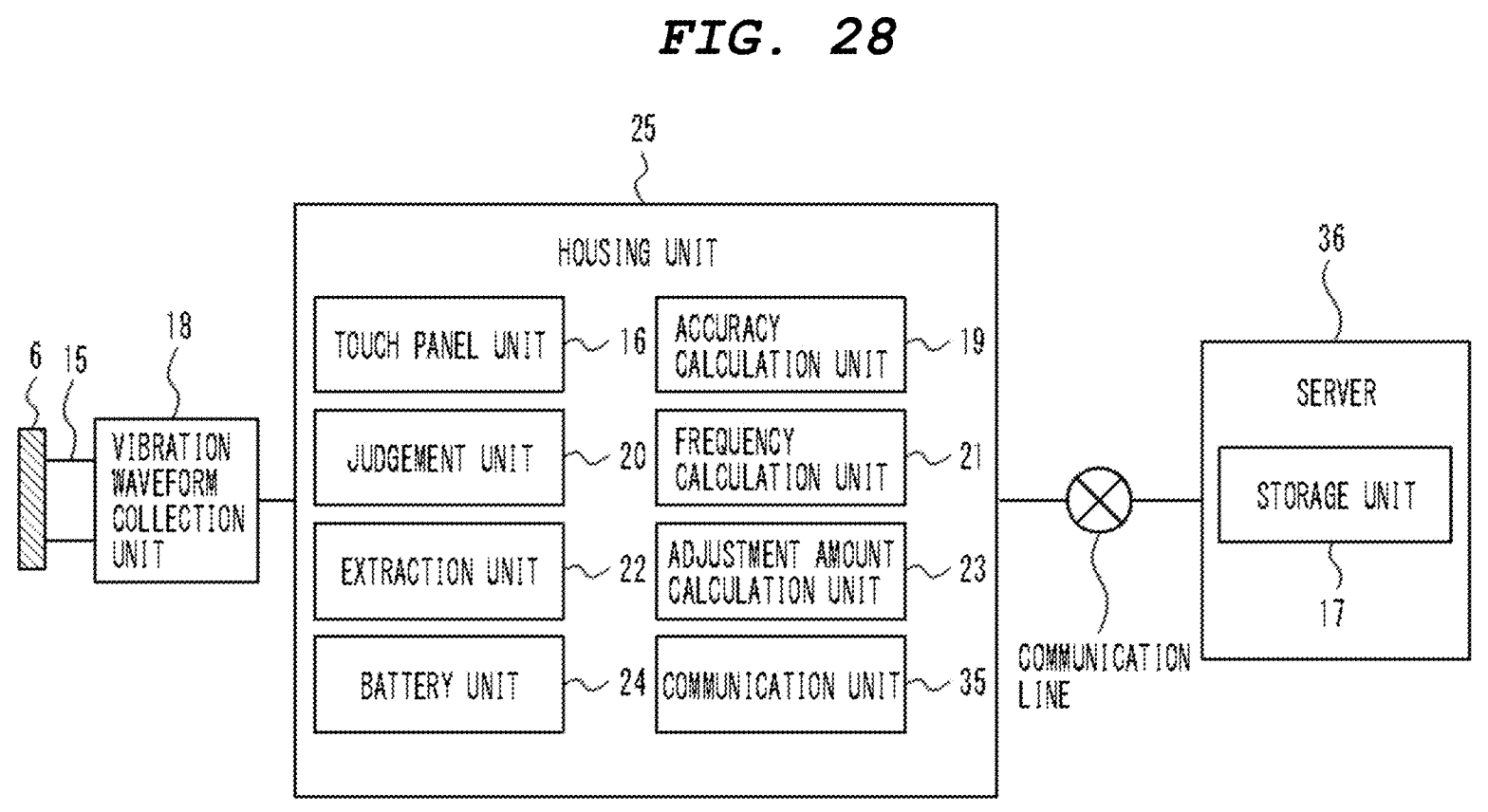

SERVER 36

STORAGE UNIT 17

COMMUNICATION LINE

HOUSING UNIT 25

TOUCH PANEL UNIT 16

ACCURACY CALCULATION UNIT 19

JUDGEMENT UNIT 20

FREQUENCY CALCULATION UNIT 21

EXTRACTION UNIT 22

ADJUSTMENT AMOUNT CALCULATION UNIT 23

BATTERY UNIT 24

COMMUNICATION UNIT 35

VIBRATION WAVEFORM COLLECTION UNIT 18

Figure 29:
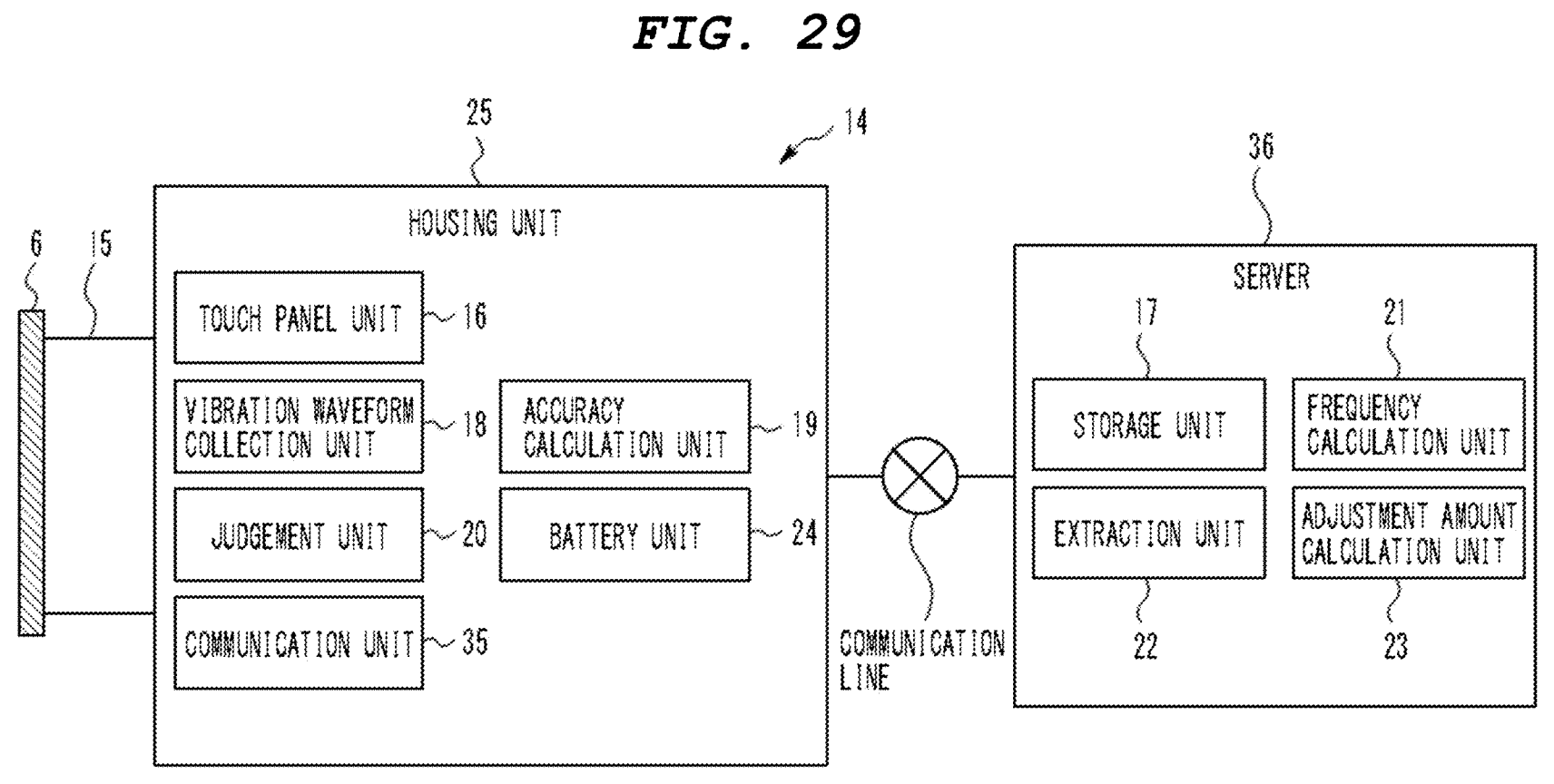

SERVER 36

STORAGE UNIT 17

FREQUENCY CALCULATION UNIT 21

EXTRACTION UNIT 22

ADJUSTMENT AMOUNT CALCULATION UNIT 23

COMMUNICATION LINE

HOUSING UNIT 25    14

TOUCH PANEL UNIT 16

VIBRATION WAVEFORM COLLECTION UNIT 18

ACCURACY CALCULATION UNIT 19

JUDGEMENT UNIT 20

BATTERY UNIT 24

COMMUNICATION UNIT 35

Figure 30:
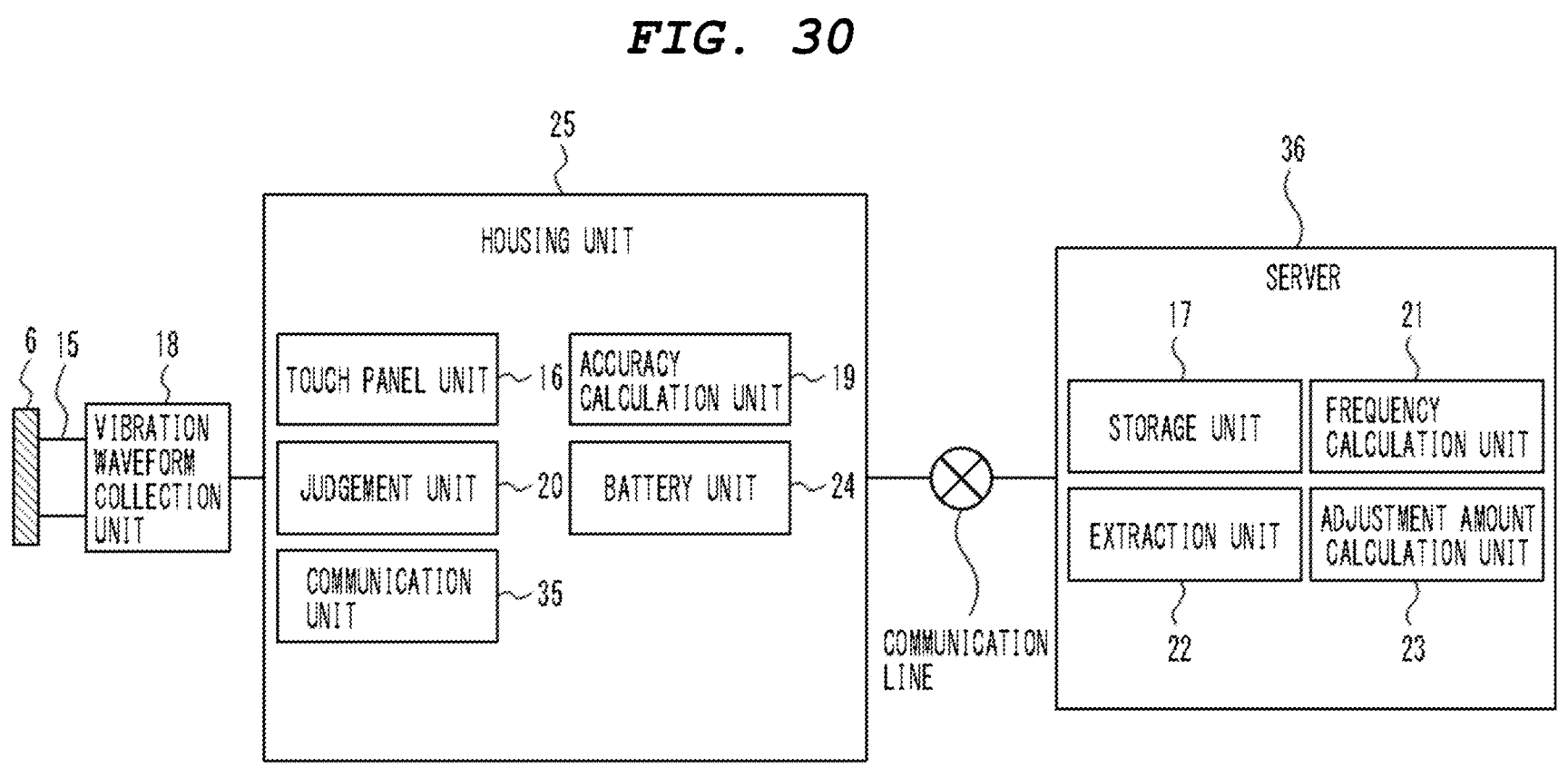

SERVER 36

STORAGE UNIT 17

FREQUENCY CALCULATION UNIT 21

EXTRACTION UNIT 22

ADJUSTMENT AMOUNT CALCULATION UNIT 23

COMMUNICATION LINE

HOUSING UNIT 25

TOUCH PANEL UNIT 16

ACCURACY CALCULATION UNIT 19

JUDGEMENT UNIT 20

BATTERY UNIT 24

COMMUNICATION UNIT 35

VIBRATION WAVEFORM COLLECTION UNIT 18

BUILDING FACILITY VIBRATION MEASUREMENT DEVICE AND MANAGEMENT SYSTEM

CROSS-REFERENCE TO RELATED APPLICATION

The present application is based on PCT filing PCT/JP2019/038595, filed Sep. 30, 2019, the entire contents of which are incorporated herein by reference.

FIELD

The present invention relates to a building facility vibration measurement device and a management system.

BACKGROUND

JP3188833B2 discloses a vibration measurement device for elevators and escalators. With the vibration measurement device, it is possible to measure the tension of the rope of an elevator serving as a building facility.

CITATION LIST

Patent Literature

[Patent Literature 1] JP3188833B2

SUMMARY

Technical Problem

However, the vibration measurement device described in JP3188833B2 fails to have a function of checking whether the specs are sufficient for the measurement of the vibration of the building facility. Therefore, there may be a case where the vibration of the building facility cannot be accurately measured.

The present invention has been made to solve the above-mentioned problem, and it is an object of the present invention to provide a building facility vibration measurement device and a management system that can easily ascertain whether the specs are sufficient for the measurement of the vibration of the building facility.

Solution to Problem

A building facility vibration measurement device according to the invention includes an acceleration detection unit configured to detect acceleration, an acceleration collection unit configured to collect the acceleration detected by the acceleration detection unit, an accuracy calculation unit configured to calculate detection accuracy of the acceleration from information on the acceleration collected by the acceleration collection unit; and a judgement unit configured to judge whether vibration of a building facility can be measured based on the detection accuracy calculated by the accuracy calculation unit.

A building facility management system according to the invention includes a storage device configured to receive, from the vibration measurement device, product information from which an acceleration detection unit is capable of being identified and information on a spec judgement result, and configured to store the product information and the information on the spec judgement result in an associated manner.

Advantageous Effects

According to these inventions, the vibration measurement device judges whether the vibration of the building facility can be measured based on acceleration detection accuracy. Accordingly, it is possible to easily ascertain whether the specs of the vibration measurement device are sufficient for the measurement of the vibration of the building facility.

BRIEF DESCRIPTION OF DRAWINGS

FIGS. 10A and 10B are plan views of the first example of the mounting tool utilized in the elevator rope tension measurement system according to the embodiment 1;

FIG. 11 is a plan view of a second example of the mounting tool utilized in the elevator rope tension measurement system according to the embodiment 1;

FIG. 23 is a flowchart for describing an outline of actions of the rope tension measurement device utilized in the elevator rope tension measurement system according to the embodiment 1;

FIG. 27 is a block diagram illustrating an elevator rope tension measurement system according to the embodiment 2;

FIG. 28 is a block diagram illustrating a modified example of the elevator rope tension measurement system according to the embodiment 2;

FIG. 29 is a block diagram illustrating an elevator rope tension measurement system according to the embodiment 3;

FIG. 30 is a block diagram illustrating a modified example of the elevator rope tension measurement system according to the embodiment 3;

FIG. 31 is a block diagram illustrating an elevator rope tension measurement system according to the embodiment 4;

FIG. 32 is a block diagram illustrating a modified example of the elevator rope tension measurement system according to the embodiment 4.

DESCRIPTION OF EMBODIMENTS

Embodiments of the inventions will be described with reference to attached drawings. In the respective drawings, identical or corresponding components are given the same reference numbers. The repeated description of such components will be simplified or omitted when appropriate.

Embodiment 1

Figure 1:
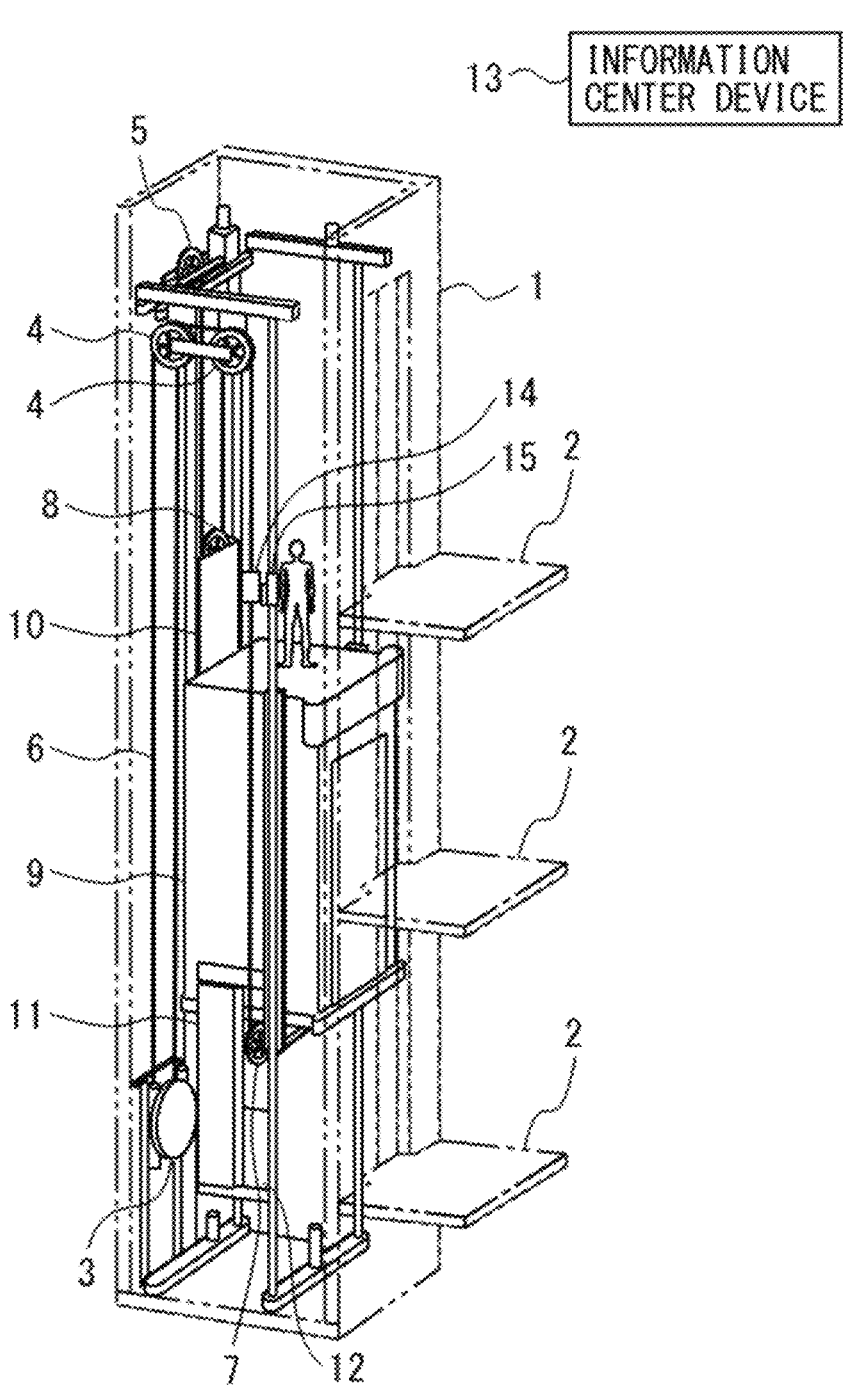
FIG. 1 is a configuration diagram of an elevator system in which an elevator rope tension measurement system according to an embodiment 1 is used.

FIG. 1 is a diagram of a configuration of an elevator system in which an elevator rope tension measurement system according to an embodiment 1 is used.

In the elevator system illustrated in FIG. 1, a hoistway 1 penetrates through floors of a building not illustrated in the drawing. A plurality of halls 2 are provided to respective floors of the building. Each of the plurality of halls 2 faces the hoist way 1.

A traction machine 3 is provided at the lower portion of the hoistway 1. A pair of car-side return sheaves 4 are provided at the upper portion in the hoistway 1. A counterweight-side return sheave 5 is provided at the upper portion in the hoistway 1.

A plurality of ropes 6 are wound onto the traction machine 3, the pair of car-side return sheaves 4, and the counterweight-side return sheave 5. Both end portions of each of the plurality of ropes 6 are fixed to the upper portion of the hoistway 1. In FIG. 1, only one rope 6 is shown.

A pair of car-side suspension sheaves 7 are supported by the ropes 6 at a position closer to one end portion side of the ropes 6 than the pair of car-side return sheaves 4. In FIG. 1, only one car-side suspension sheave 7 is shown. A weight-side suspension sheave 8 is supported by the ropes 6 at a position closer to the other end portion side of the ropes 6 than the weight-side return sheave 5.

A car 9 is provided in the hoistway 1. The lower portion of the car 9 is supported by the pair of car-side suspension sheaves 7. A counterweight 10 is provided in the hoistway 1. The upper portion of the counterweight 10 is supported by the counterweight-side suspension sheave 8.

A control device 11 is provided at the lower portion in the hoistway 1. The control device 11 is electrically connected to the traction machine 3 and the like. The control device 11 is provided in such a manner that the control device 11 can perform overall control of the elevator.

A monitoring device 12 is provided at the lower portion in the hoistway 1. The monitoring device 12 is electrically connected to the control device 11. The monitoring device 12 is provided in such a manner that the monitoring device 12 can monitor a state of the elevator based on information from the control device 11.

An information center device 13 is provided to a place separated from the building provided with the elevator. For example, the information center device 13 may be provided to the maintenance company for the elevator. The information center device 13 is provided in such a manner that the information center device 13 can grasp the state of the elevator based on information from the monitoring device 12.

In adjusting dispersion of tension between the plurality of ropes 6, a worker utilizes the rope tension measurement system in a state where the worker is on the ceiling of the car 9. The rope tension measurement system includes a rope tension measurement device 14 and an attachment jig 15.

For example, the rope tension measurement device 14 may be a mobile terminal, such as a smartphone. The attachment jig 15 is attached to the rope 6 that is a measurement target in a state of holding the rope tension measurement device 14.

In such a state, the worker applies vibration to the rope 6. At this point of operation, the rope tension measurement device 14 collects the vibration waveform of the rope 6.

After the vibration waveform of each of the plurality of ropes 6 is collected, the rope tension measurement device 14 calculates dispersion of tension between the plurality of ropes 6 based on the vibration waveforms of the plurality of ropes 6. The rope tension measurement device 14 indicates whether adjustment of the tension is necessary based on the dispersion of tension between the plurality of ropes 6.

The worker adjusts the tension of the rope 6 for which a necessity of adjustment is indicated.

Next, the rope tension measurement device 14 will be described with reference to FIG. 2.

Figure 2:
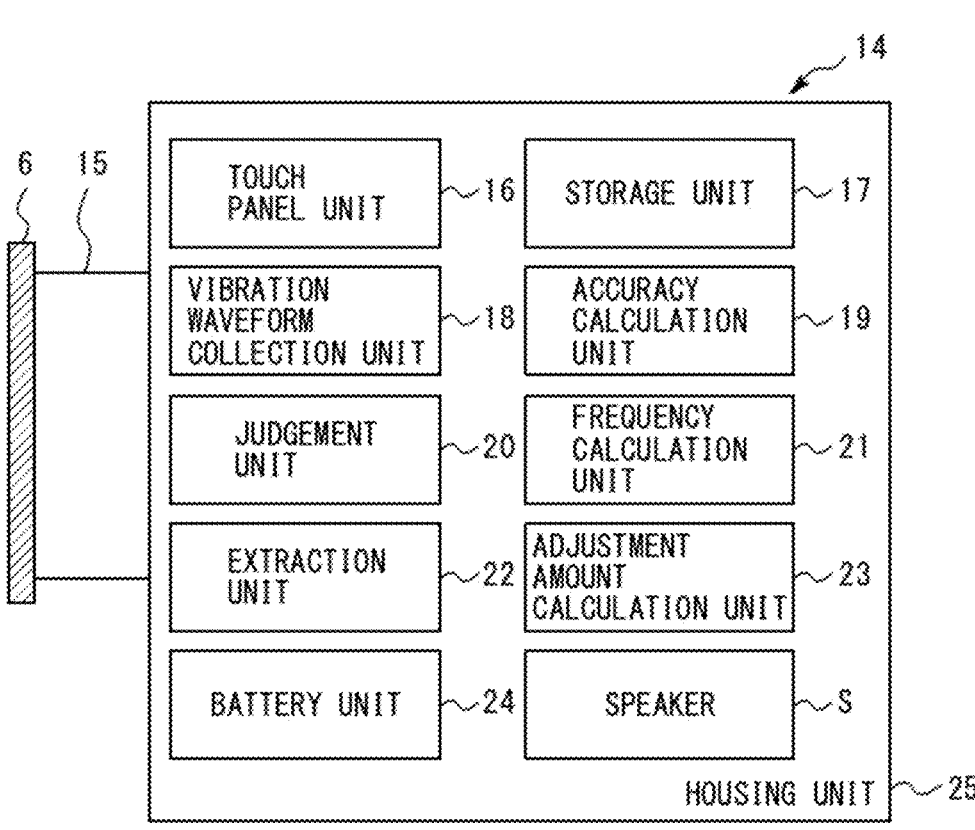
FIG. 2 is a block diagram of a rope tension measurement device utilized in the elevator rope tension measurement system according to the embodiment 1.

FIG. 2 is a block diagram of the rope tension measurement device utilized in the elevator rope tension measurement system according to the embodiment 1.

As illustrated in FIG. 2, the rope tension measurement device 14 includes a touch panel unit 16, a storage unit 17, a vibration waveform collection unit 18, an accuracy calculation unit 19, a judgement unit 20, a frequency calculation unit 21, an extraction unit 22, an adjustment amount calculation unit 23, a battery unit 24, and a housing unit 25. In the rope tension measurement device 14, at least one processor reads and executes a program stored in at least one memory to achieve respective functions of the respective units.

The touch panel unit 16 is provided in such a manner that the touch panel unit 16 can receive an external input operation. The touch panel unit 16 is provided in such a manner that the touch panel unit 16 can indicate information. The storage unit 17 is provided in such a manner that the storage unit 17 can store various pieces of information.

The vibration waveform collection unit 18 collects the vibration waveform of the rope 6. The vibration waveform collection unit 18 may be an acceleration sensor. In this case, the vibration waveform collection unit 18 has a function of an acceleration detection unit and a function of an acceleration collection unit. The acceleration detection unit has a function of detecting acceleration. The acceleration collection unit has a function of collecting the acceleration detected by the acceleration detection unit. For example, based on information on the height of the hoistway 1 or the length of the ropes 6 that is externally inputted, the vibration waveform collection unit 18 sets a time period for collecting the vibration waveform of the rope 6. For example, the vibration waveform collection unit 18 performs resampling processing on the collected vibration waveforms.

In performing a pre-check, the accuracy calculation unit 19 calculates acceleration detection accuracy from information on acceleration collected by the vibration waveform collection unit 18. In performing the pre-check, the judgement unit 20 judges whether the tension of the rope 6 can be measured based on the detection accuracy calculated by the accuracy calculation unit 19.

In measuring the tension of the rope 6, based on the measurement resolution calculated from the time period for collecting and collection cycles for collecting the vibration waveform by the vibration waveform collection unit 18, the frequency calculation unit 21 selects a method for calculating the frequency of the vibration waveform collected by the vibration waveform collection unit 18. For example, the frequency calculation unit 21 calculates the frequency of the vibration waveform based on the calculation results of the autocorrelation function and the Fourier transform of the vibration waveform collected by the vibration waveform collection unit 18.

The extraction unit 22 calculates dispersion of tension between the respective ropes 6 based on the information on the calculation results from the frequency calculation unit 21, and extracts the ropes 6 for which the tension is outside of designated values. The adjustment amount calculation unit 23 calculates the adjustment amount for the rope 6 extracted by the extraction unit 22.

The battery unit 24 supplies power to the touch panel unit 16, the storage unit 17, the vibration waveform collection unit 18, the frequency calculation unit 21, the extraction unit 22, and the adjustment amount calculation unit 23. The housing unit 25 forms an outer shell of the rope tension measurement device 14. The housing unit 25 houses the touch panel unit 16, the storage unit 17, the vibration waveform collection unit 18, the frequency calculation unit 21, the extraction unit 22, the adjustment amount calculation unit 23, and the battery unit 24.

Next, the first example of the pre-check of the rope tension measurement device 14 will be described with reference to FIG. 3 and FIG. 4.

Figure 3:
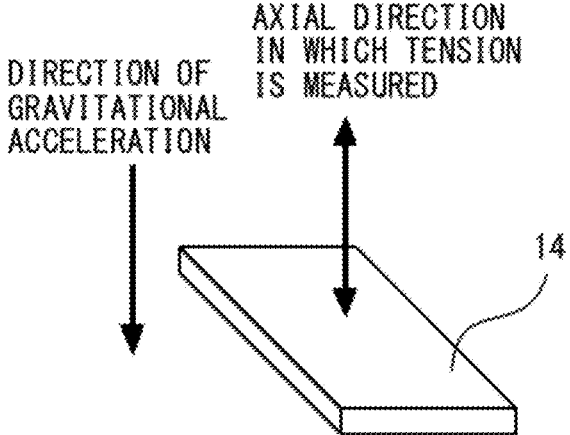
FIG. 3 is a perspective view of the rope tension measurement device utilized in the elevator rope tension measurement system according to the embodiment 1.

FIG. 3 is a perspective view of the rope tension measurement device utilized in the elevator rope tension measurement system according to the embodiment 1. FIG. 4 is a graph illustrating the detection result of acceleration detected by the rope tension measurement device utilized in the elevator rope tension measurement system according to the embodiment 1.

As illustrated in FIG. 3, the rope tension measurement device 14 is maintained in a standstill state such that the axial direction of the vibration waveform collection unit 18 in measuring the tension of the rope 6 is aligned with the direction of gravitational acceleration. In such a state, the vibration waveform collection unit 18 collects acceleration during a certain time period.

Figure 4:
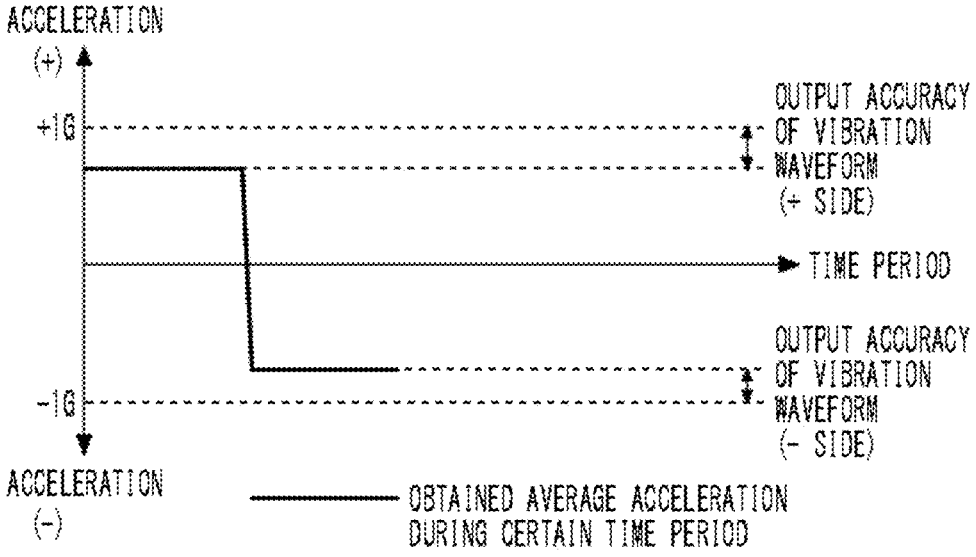
FIG. 4 is a graph showing the detection result of acceleration detected by the rope tension measurement device utilized in the elevator rope tension measurement system according to the embodiment 1.

As illustrated in FIG. 4, the accuracy calculation unit 19 calculates a difference between the acceleration collected by the vibration waveform collection unit 18 and the gravitational acceleration. The judgement unit 20 judges whether the tension of the rope 6 can be measured based on the difference calculated by the accuracy calculation unit 19. Specifically, the judgement unit 20 judges that the rope tension measurement device 14 is permitted to utilize for the measurement of the tension of the rope 6 when the difference calculated by the accuracy calculation unit 19 is less than a predetermined threshold. The judgement unit 20 judges that the rope tension measurement device 14 cannot be utilized for the measurement of the tension of the rope 6 when the difference calculated by the accuracy calculation unit 19 is equal to or more than the predetermined threshold. Note that when acceleration on the plus (+) side and acceleration on the − side are collected by the vibration waveform collection unit 18 by inverting the rope tension measurement device 14, a judgement can also be made by using both the acceleration on the plus (+) side and the acceleration on the minus (−) side.

Next, the second example of the pre-check of the rope tension measurement device 14 will be described with reference to FIG. 5.

Figure 5:
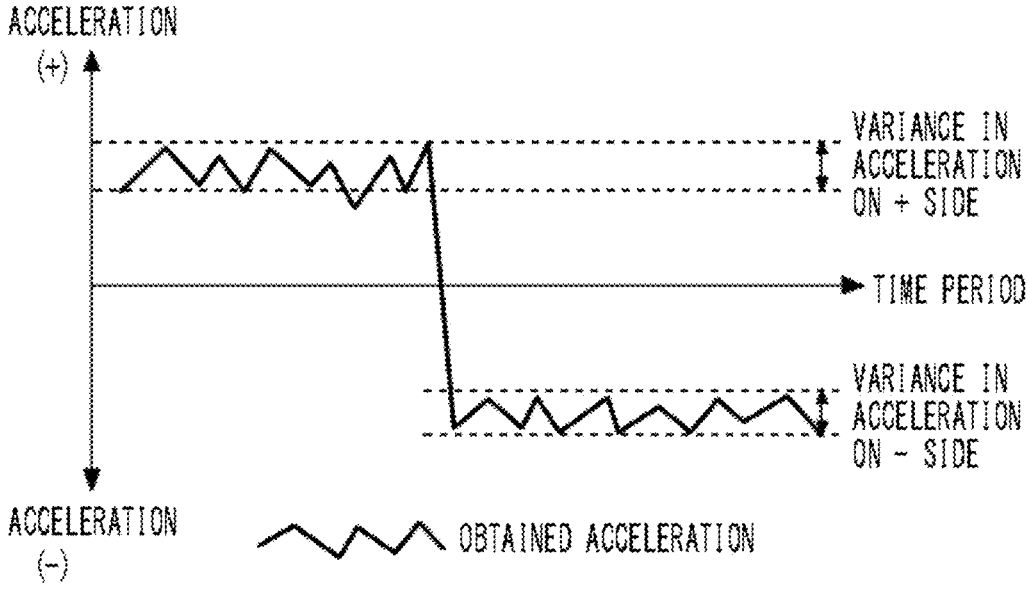
FIG. 5 is a graph showing the detection result of acceleration detected by the rope tension measurement device utilized in the elevator rope tension measurement system according to the embodiment 1.

FIG. 5 is a graph showing the detection result of acceleration detected by the rope tension measurement device utilized in the elevator rope tension measurement system according to the embodiment 1.

Also in the second example, in the same manner as the first example, the rope tension measurement device 14 is maintained in a standstill state such that the axial direction of the vibration waveform collection unit 18 in measuring the tension of the rope 6 is aligned with the direction of gravitational acceleration. In such a state, the vibration waveform collection unit 18 collects acceleration during a certain time period.

As illustrated in FIG. 5, the accuracy calculation unit 19 calculates the variance of acceleration collected by the vibration waveform collection unit 18. The judgement unit 20 judges whether the tension of the rope 6 can be measured based on the variance calculated by the accuracy calculation unit 19. Specifically, the judgement unit 20 judges that the rope tension measurement device 14 is allowed to use in measuring the tension of the rope 6 when the variance calculated by the accuracy calculation unit 19 is less than a predetermined threshold. The judgement unit 20 judges that the rope tension measurement device 14 is not allowed to use in measuring the tension of the rope 6 when the variance calculated by the accuracy calculation unit 19 is equal to or more than the predetermined threshold. Note that when acceleration on a plus (+) side and acceleration on a minus (−) side are collected by the vibration waveform collection unit 18 by inverting the rope tension measurement device 14, a judgement can also be made by using both the acceleration on the plus (+) side and acceleration on the minus (−) side.

Next, the third example of the pre-check of the rope tension measurement device 14 will be described with reference to FIG. 6.

Figure 6:
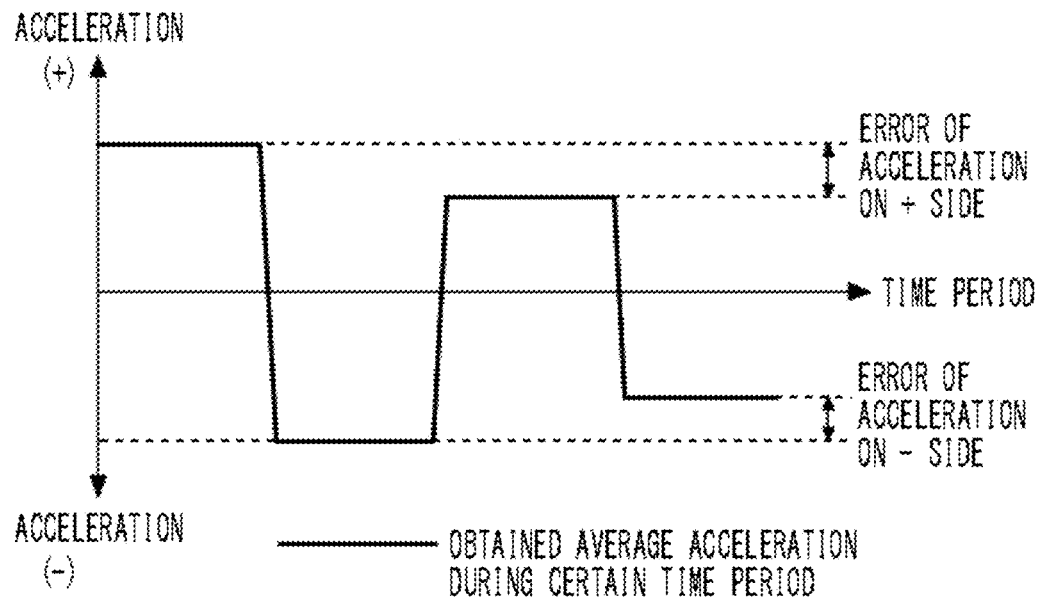
FIG. 6 is a graph showing the detection result of acceleration detected by the rope tension measurement device utilized in the elevator rope tension measurement system according to the embodiment 1.

FIG. 6 is a graph illustrating the detection result of acceleration detected by the rope tension measurement device utilized in the elevator rope tension measurement system according to the embodiment 1.

Also in the third example, in the same manner as the first example, the rope tension measurement device 14 is maintained in a standstill state such that the axial direction of the vibration waveform collection unit 18 in measuring the tension of the rope 6 is aligned with the direction of gravitational acceleration. In such a state, the vibration waveform collection unit 18 collects acceleration a plurality of number of times during a certain time period.

As shown in FIG. 6, the accuracy calculation unit 19 calculates an average value of accelerations collected by the vibration waveform collection unit 18 for each time and the maximum value of an absolute difference between the average values for each time. The judgement unit 20 judges whether the tension of the rope 6 can be measured based on the maximum value calculated by the accuracy calculation unit 19. Specifically, the judgement unit 20 judges that the rope tension measurement device 14 is allowed to use in measuring the tension of the rope 6 when the maximum value calculated by the accuracy calculation unit 19 is less than a predetermined threshold. The judgement unit 20 judges that the rope tension measurement device 14 is not allowed to use in measuring the tension of the rope 6 when the maximum value calculated by the accuracy calculation unit 19 is equal to or more than the predetermined threshold. Note that when acceleration on a plus (+) side and acceleration on a minus (−) side are collected by the vibration waveform collection unit 18 by inverting the rope tension measurement device 14, a judgement can also be made by using both the acceleration on the plus (+) side and acceleration on the minus (−) side.

Note that, in the first to the third examples, when acceleration on the plus (+) side and acceleration on the minus (−) side are collected by the vibration waveform collection unit 18 by inverting the rope tension measurement device 14, a judgement can also be made by using both the acceleration on the plus (+) side and acceleration on the minus (−) side. After the completion of the collection of the acceleration on the plus (+) side or the minus (−) side by the vibration waveform collection unit 18, the worker is informed of the completion of the collection by a sound via a speaker S. The completion of the collection may be indicated on the touch panel unit 16 to prompt the worker to shift to the next measurement. Further, also after the completion of measurement or judgement of accuracy, variance, or error, the measurer is informed of the completion by a sound via a speaker S. The completion of the judgement may be indicated on the touch panel unit 16.

Next, the fourth example of the pre-check of the rope tension measurement device 14 will be described with reference to FIG. 7.

Figure 7:
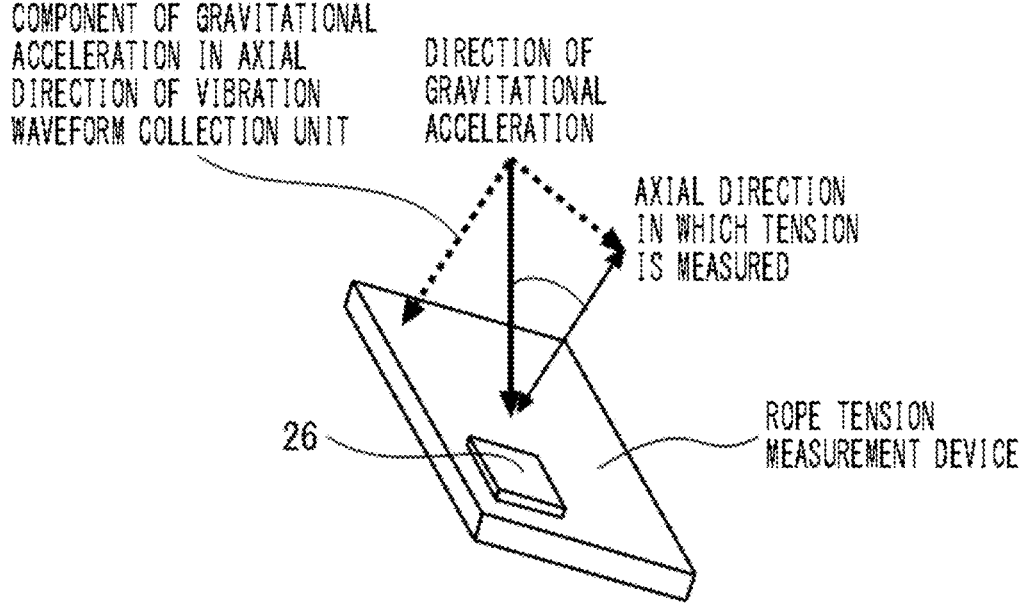
FIG. 7 is a perspective view of the rope tension measurement device utilized in the elevator rope tension measurement system according to the embodiment 1.

FIG. 7 is a perspective view of the rope tension measurement device utilized in the elevator rope tension measurement system according to the embodiment 1.

As illustrated in FIG. 7, in the case where the rope tension measurement device 14 includes an angle detection unit 26, such as a gyro, based on an angle detected by the angle detection unit 26, the vibration waveform collection unit 18 calculates the component of gravitational acceleration from the acceleration detected by the acceleration detection unit. The judgement unit 20 judges whether the tension of the rope 6 can be measured based on the component of gravitational acceleration calculated by the vibration waveform collection unit 18. A judgement method used at this point of operation may be substantially equal to any one of judgement methods used in the first example to the third example.

Next, a method for managing the rope tension measurement device 14 will be described with reference to FIG. 8.

Figure 8:
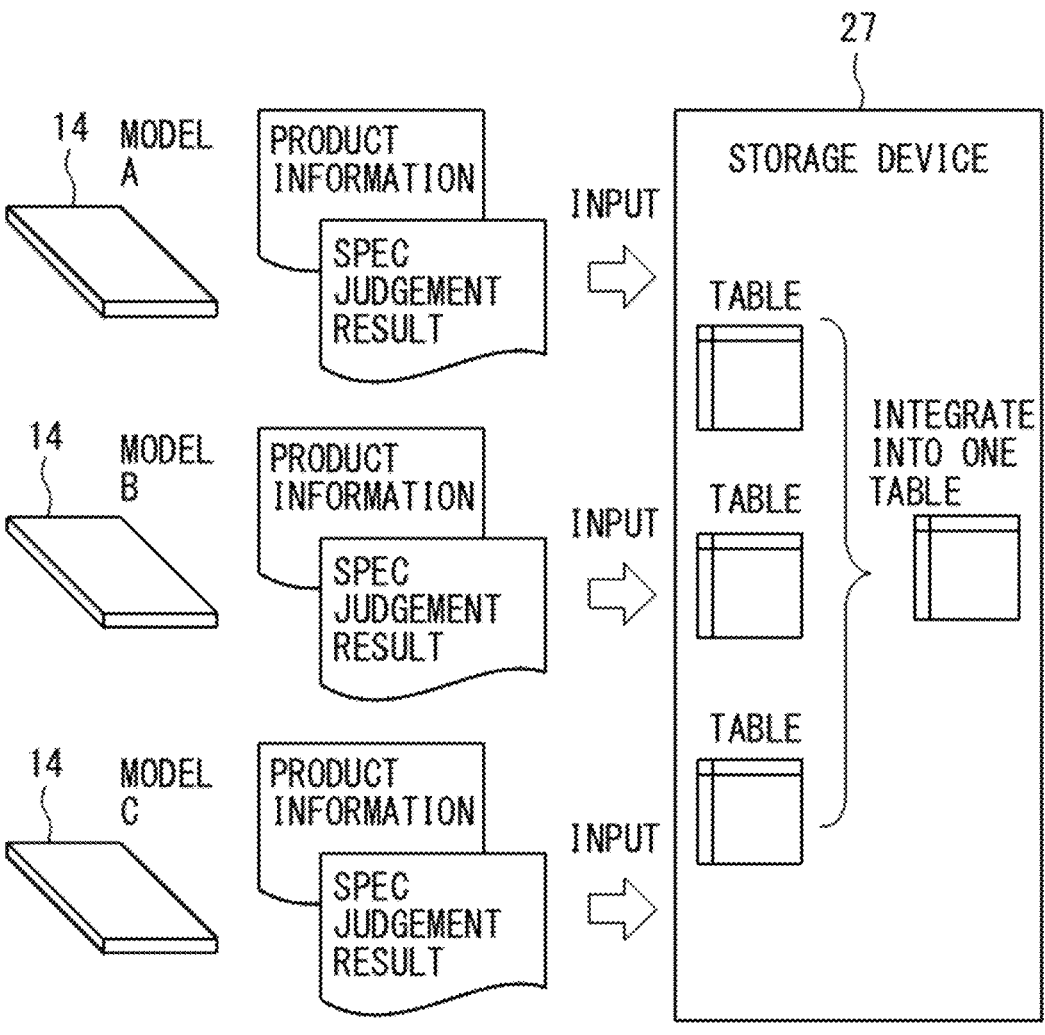
FIG. 8 is a view for describing a method for managing the rope tension measurement device utilized in the elevator rope tension measurement system according to the embodiment 1.

FIG. 8 is a view for describing the method for managing the rope tension measurement device utilized in the elevator rope tension measurement system according to the embodiment 1.

In FIG. 8, a storage device 27 is provided to the maintenance company or the like for the elevator. The storage device 27 receives, from each of a plurality of models of the rope tension measurement devices 14, product information from which an acceleration sensor serving as the vibration waveform collection unit 18 can be identified and information on the spec judgement result relating to whether the tension of the rope 6 can be measured. Then, the storage device 27 stores the product information and the information on the spec judgement result in an associated manner to form a measurement device selection table.

Next, the first example of the attachment jig 15 will be described with reference to FIG. 9, FIG. 10A and FIG. 10B.

Figure 9:
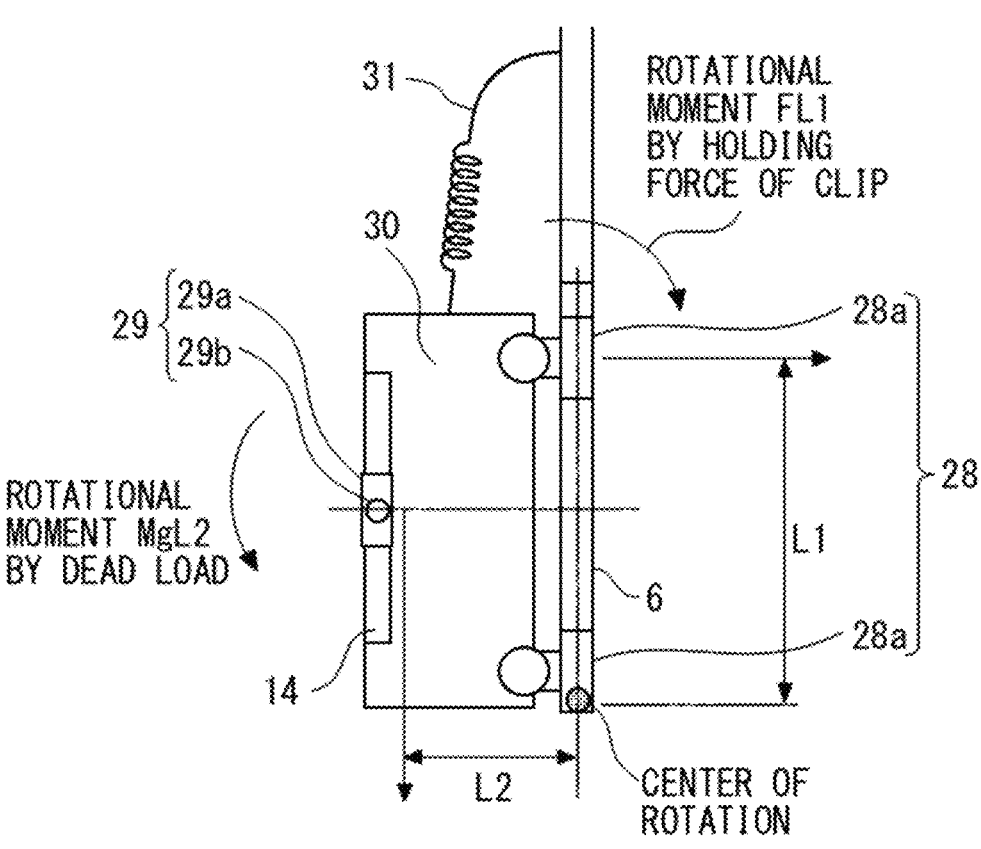
FIG. 9 is a side view of a first example of a mounting tool utilized in the elevator rope tension measurement system according to the embodiment 1.

FIG. 9 is a side view of the first example of the attachment jig utilized in the elevator rope tension measurement system according to the embodiment 1. FIGS. 10A and 10B is a plan view of the first example of the attachment jig utilized in the elevator rope tension measurement system according to the embodiment 1.

As shown in FIG. 9, the attachment jig 15 includes a grip body 28, a holder 29, a connecting body 30, and a fall preventing body 31.

For example, the grip body 28 includes a pair of grip parts 28a. The pair of grip parts 28a are arranged in a row in the vertical direction. For example, the pair of grip parts 28a may be clips each having a gripping surface with a curvature conforming to the outer diameter of the rope 6. The pair of grip parts 28a grip the rope 6.

For example, the holder 29 includes a holding part 29a and a movable part 29b. The holding part 29a is provided to one side of the holder 29. The holding part 29a is provided in such a manner that the holding part 29a can be moved in the horizontal direction. The holding part 29a holds the rope tension measurement device 14 from the side. The movable part 29b generates a load in the horizontal direction by a stress of an elastic body, such as a spring, so as to apply a force of holding the rope tension measurement device 14 to the holding part 29a.

For example, the connecting body 30 is formed into a rectangular shape. The connecting body 30 connects the grip body 28 with the holder 29. One side of the connecting body 30 is connected with one side of the holder 29. The connecting body 30 is orthogonal to the holder 29. The connecting body 30 has a plate thickness with a natural frequency higher than the frequency of the rope 6. Provided that the connecting body 30 has a natural frequency higher than the frequency of the rope 6, it is not always necessary for the connecting body 30 to have a rectangular shape.

For example, the fall preventing body 31 may be a curly cord. One side of the fall preventing body 31 is connected to the attachment jig 15. In the first example, one side of the fall preventing body 31 is connected to the connecting body 30. The other side of the fall preventing body 31 is, at a position higher than the rope tension measurement device 14, attached to an adjacent rope 6 other than the rope on which a measurement is to be made or to a structural body of the elevator. The fall preventing body 31 prevents the attachment jig 15 from falling.

To prevent the rope tension measurement device 14 from falling, the attachment jig 15 may include the second fall prevention body not shown in the drawing. In this case, one side of the second fall prevention body is connected to the attachment jig 15. The other side of the second fall preventing body is attached to the rope tension measurement device 14.

In the attachment jig 15, the product of a distance L1 between positions where the pair of grip parts 28a hold the rope 6 and a gripping force F of the upper grip part 28a for griping the rope 6 is set to be greater than the rotational moment MgL2 by a dead load Mg of the rope tension measurement device 14.

As shown in FIGS. 10A and 10B, the plurality of ropes 6 are arranged in a state of being divided into the first row and the second row. The ropes 6 in the first row and the ropes 6 in the second row are disposed with a separation L3.

A width L4 of the connecting body 30 is greater than the separation L3 between the ropes 6 in the first row and the ropes 6 in the second row. Therefore, when the grip body 28 grips any one of the ropes 6 in the first row, the holder 29 is disposed on a side opposite to the ropes 6 in the first row with respect to the ropes 6 in the second row. As a result, the rope tension measurement device 14 is disposed at a position that does not interfere with the ropes 6 in the second row.

For example, in the case where the wall of the hoistway 1 is disposed on the right as shown in FIG. 10A, the grip body 28 grips the rightmost rope 6 in the first row so that the holder 29 is disposed on the left of the connecting body 30. As a result, the rope tension measurement device 14 is disposed at a position that does not interfere with the wall.

For example, in the case where the wall of the hoistway 1 is disposed on the left as shown in FIG. 10B, the grip body 28 grips the leftmost rope 6 in the first row so that the holder 29 is disposed on the right of the connecting body 30. As a result, the rope tension measurement device 14 is disposed at a position that does not interfere with the wall.

Next, the second example of the attachment jig 15 will be described with reference to FIG. 11 and FIG. 12.

FIG. 11 is a plan view of the second example of the attachment jig utilized in the elevator rope tension measurement system according to the embodiment 1. FIG. 12 is a side view of the second example of the attachment jig utilized in the elevator rope tension measurement system according to the embodiment 1.

Figure 12:
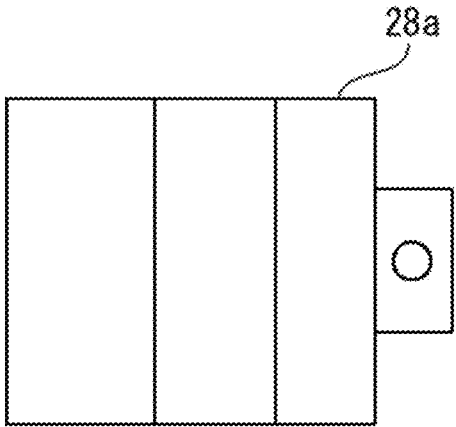
FIG. 12 is a side view of the second example of the mounting tool utilized in the elevator rope tension measurement system according to the embodiment 1.

As shown in FIG. 11 and FIG. 12, a grip part 28a of the grip body 28 is a clip having gripping surfaces with a plurality of curvatures conforming to outer diameters of the plurality of ropes 6. Specifically, the grip body 28 has the first gripping surface, the second gripping surface, and the third gripping surface. The first gripping surface, the second gripping surface, and the third gripping surface are continuously formed from the fulcrum of the clip in this order.

The curvature of the first gripping surface is $R_1$. The curvature of the second gripping surface is $R_2$. $R_2$ is set to be greater than $R_1$. The curvature of the third gripping surface is $R_3$. $R_3$ is set to be greater than $R_2$. In the second example, the grip body 28 has three gripping surfaces having different curvatures. However, the grip body 28 may have two gripping surfaces or four or more gripping surfaces.

Next, the third example of the attachment jig 15 will be described with reference to FIG. 13.

Figure 13:
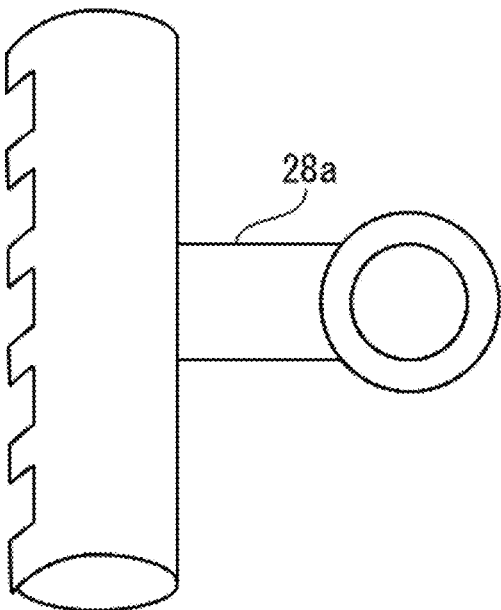
FIG. 13 is a perspective view of a third example of the mounting tool utilized in the elevator rope tension measurement system according to the embodiment 1.

FIG. 13 is a perspective view of the third example of the attachment jig utilized in the elevator rope tension measurement system according to the embodiment 1.

As shown in FIG. 13, in the grip body 28, the tips of the grip part 28a are formed into an uneven shape so as to fit to unevenness on the outer periphery of the rope 6.

Next, the fourth example of the attachment jig 15 will be described with reference to FIG. 14.

Figure 14:
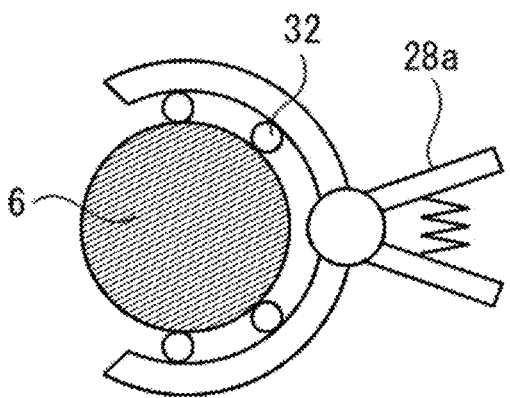
FIG. 14 is a plan view of a fourth example of the mounting tool utilized in the elevator rope tension measurement system according to the embodiment 1.

FIG. 14 is a plan view of the fourth example of the attachment jig utilized in the elevator rope tension measurement system according to the embodiment 1.

As shown in FIG. 14, in the grip body 28, the inner surface of a grip part 28a has a plurality of protruding parts 32 that fit to unevenness on the outer periphery of the rope 6.

Next, the fifth example of the attachment jig 15 will be described with reference to FIG. 15.

Figure 15:
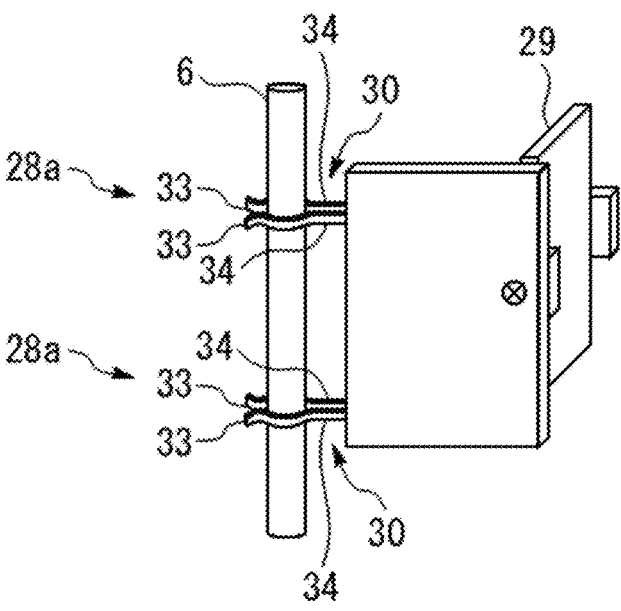
FIG. 15 is a perspective view of a fifth example of the mounting tool utilized in the elevator rope tension measurement system according to the embodiment 1.

FIG. 15 is a perspective view of the fifth example of the attachment jig utilized in the elevator rope tension measurement system according to the embodiment 1.

As shown in FIG. 15, in the grip body 28, each of the pair of grip parts 28a includes a pair of grip pieces 33.

The connecting body 30 includes a pair of connecting parts. Each of the pair of connecting parts includes a pair of connecting pieces 34.

Each grip piece 33 and each connecting piece 34 are formed of a wire member as an integral body.

Next, the sixth example of the attachment jig 15 will be described with reference to FIG. 16 and FIG. 17.

Figure 16:
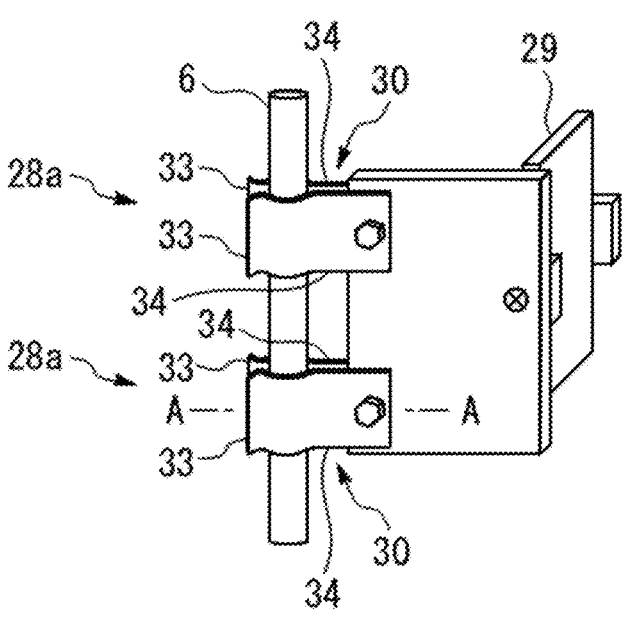
FIG. 16 is a perspective view of a sixth example of the mounting tool utilized in the elevator rope tension measurement system according to the embodiment 1.

FIG. 16 is a perspective view of the sixth example of the attachment jig utilized in the elevator rope tension measurement system according to the embodiment 1. FIG. 17 is a plan view of a main part of the sixth example of the attachment jig utilized in the elevator rope tension measurement system according to the embodiment 1.

Figure 17:
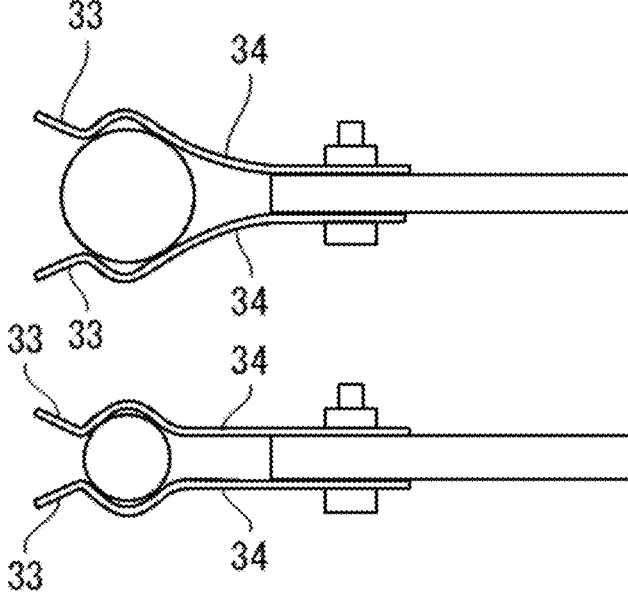
FIG. 17 is a plan view of a main portion of a sixth example of the mounting tool utilized in the elevator rope tension measurement system according to the embodiment 1.

As shown in FIG. 16 and FIG. 17, in the grip body 28, each of the pair of grip parts 28a includes a pair of grip pieces 33.

The connecting body 30 includes a pair of connecting parts. Each of the pair of connecting parts includes a pair of connecting pieces 34.

Each grip piece 33 and each connecting piece 34 are formed of a wire member as an integral body.

Next, a method for calculating the frequency of a vibration waveform obtained by the rope tension measurement device 14 will be described with reference to FIG. 18 to FIG. 21.

Figure 18:
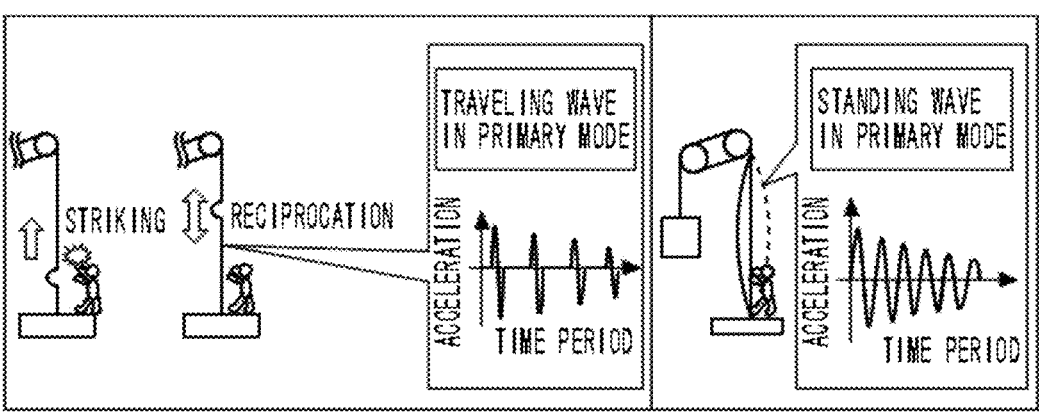
FIG. 18 is a view for describing a vibration wave of a rope of the elevator system utilized in the elevator rope tension measurement system according to the embodiment 1.
Figure 19:
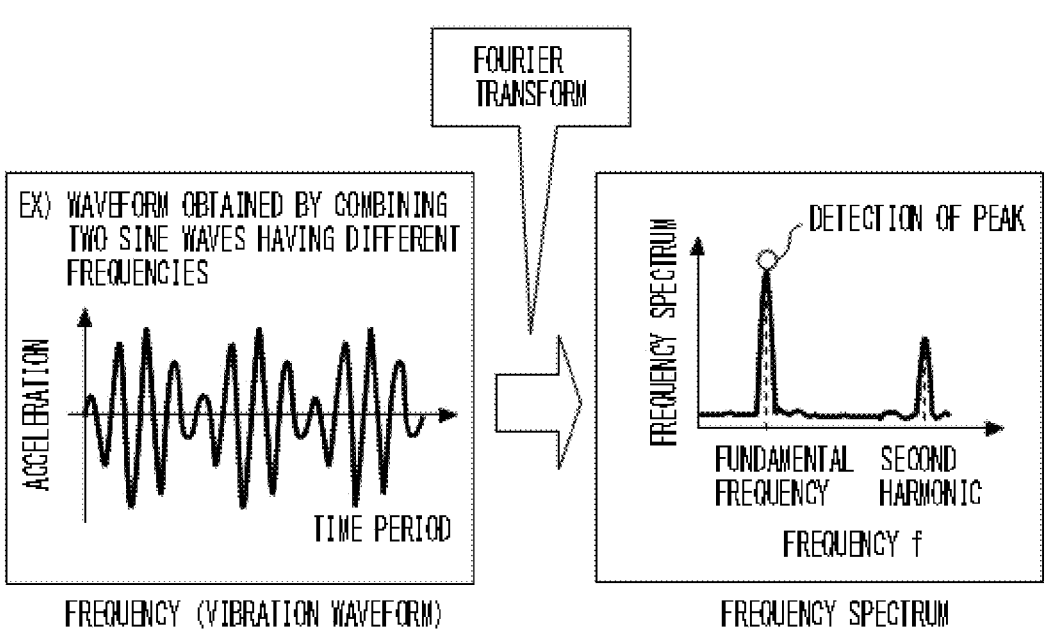
FIG. 19 is a graph for describing the Fourier transform of the vibration waveform of the rope of the elevator system utilized in the elevator rope tension measurement system according to the embodiment 1.
Figure 20:
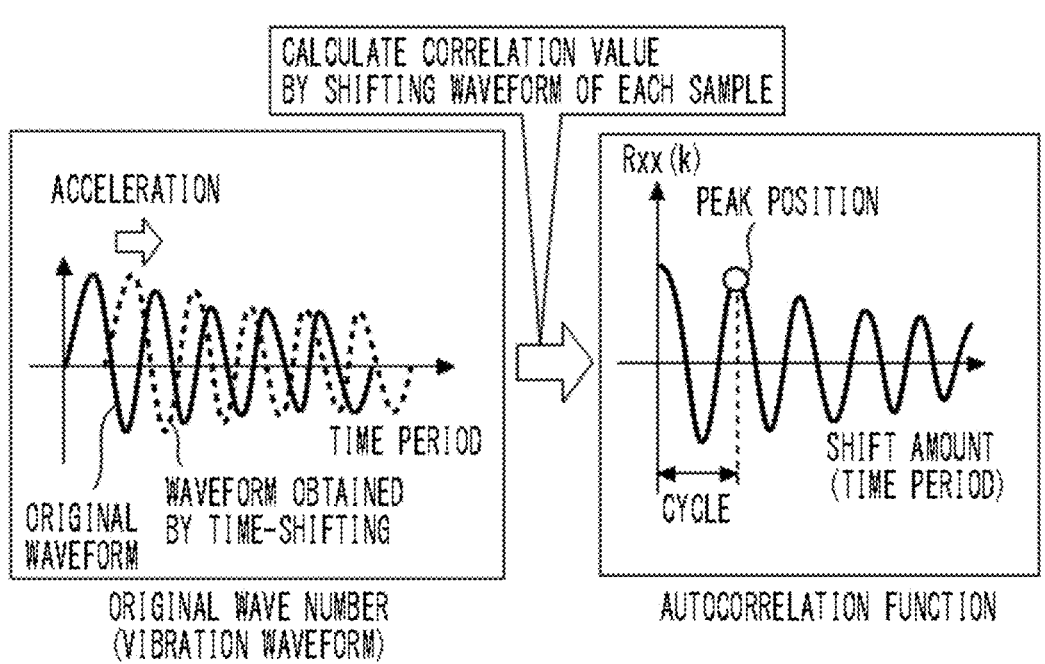
FIG. 20 is a graph for describing the autocorrelation function of the vibration waveform of the rope of the elevator system utilized in the elevator rope tension measurement system according to the embodiment 1.
Figure 21:
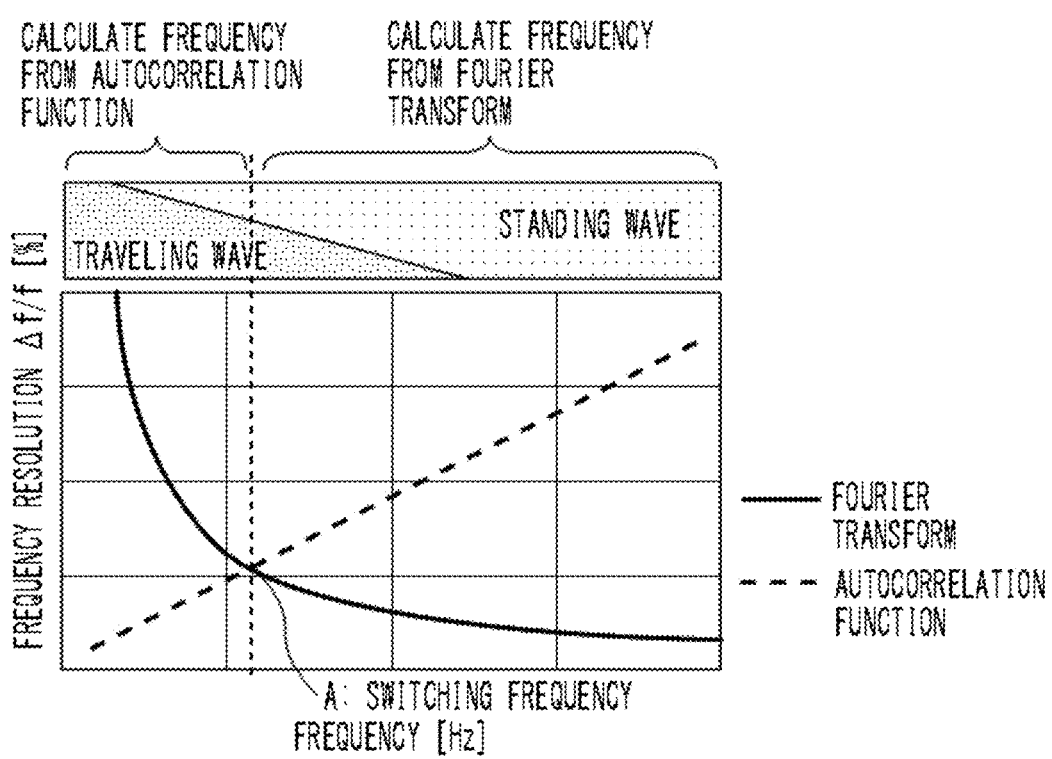
FIG. 21 is a graph for describing a method for calculating a frequency by the rope tension measurement device utilized in the elevator rope tension measurement system according to the embodiment 1.

FIG. 18 is a view for describing the vibration wave of the rope of the elevator system utilized in the elevator rope tension measurement system according to the embodiment 1. FIG. 19 is a graph for describing the Fourier transform of the vibration waveform of the rope of the elevator system utilized in the elevator rope tension measurement system according to the embodiment 1. FIG. 20 is a graph for describing the autocorrelation function of the vibration waveform of the rope of the elevator system utilized in the elevator rope tension measurement system according to the embodiment 1. FIG. 21 is a graph for describing a method for calculating the frequency by the rope tension measurement device utilized in the elevator rope tension measurement system according to the embodiment 1.

As illustrated in FIG. 18, in the case where the rope 6 has a longer length, a traveling wave is likely to be generated. In the case where the rope 6 has a shorter length, a standing wave is likely to be generated. The frequency calculation unit 21 adopts an analysis method suitable for the oscillation mode of the rope 6. For example, the rope tension measurement device 14 adopts an analysis method suitable for the oscillation mode of the rope 6 from either the Fourier transform or the autocorrelation function.

When the Fourier transform is adopted, a traveling wave containing no clear sine wave component cannot be analyzed, but a standing wave can be analyzed. At this point of operation, as shown in FIG. 19, the frequency calculation unit 21 analyzes, by the Fourier transform, the amounts of the included respective frequency components when the vibration waveform of the rope 6 is expressed as a waveform obtained by combining sine waves having different frequencies. The frequency calculation unit 21 calculates the frequency of the vibration waveform of the rope 6 from the position of the peak of the frequency spectrum obtained by the Fourier transform.

When the autocorrelation function is adopted, a traveling wave containing no clear sine wave component can be analyzed and a standing wave can also be analyzed. At this point of operation, as shown in FIG. 20, the rope tension measurement device 14 calculates, by the autocorrelation function, the degree of coincidence with the vibration waveform of the rope 6 when the vibration waveform of the rope 6 is time-shifted. Specifically, the autocorrelation function of a waveform x(i) (i=1, 2, . . . N) with N number of samples is expressed by the following expression (1).

[Math. 1]

$$R_{xx}(k) = \frac{1}{N} \sum_{i=1}^{N-k} x(i)x(i+k)$$ (1)

In the expression (1), "k" is an integer indicating a shift amount in the time direction.

The frequency calculation unit 21 calculates the cycle of the vibration waveform of the rope 6 from the position of the peak of the autocorrelation function. The frequency calculation unit 21 calculates the frequency of an original vibration waveform of the rope 6 by using the following expression (2).

[Math. 2]

$$f = \frac{1}{T}$$ (2)

In the expression (2), "T" indicates a cycle (sec) of a vibration waveform, and "f" indicates a frequency (Hz).

As shown in FIG. 21, the frequency calculation unit 21 selectively uses the Fourier transform or the autocorrelation function so as to adopt the higher resolution range.

A frequency measurement resolution with respect to a measured value f of the vibration frequency of the rope 6 is expressed as $\Delta f/f$ (%). A measurement resolution when a frequency is obtained by using the autocorrelation function is expressed by the following expression (3). A measurement resolution when a frequency is obtained by the Fourier transform is expressed by the following expression (4).

[Math. 3]

$$\frac{\Delta f}{f} = \frac{1}{\frac{f_s}{f} + 1}$$ (3)

[Math. 4]

$$\frac{\Delta f}{f} = \frac{f_s}{N} \frac{1}{f}$$ (4)

In the expression (3) and the expression (4), "fs" indicates the sampling frequency (Hz) of the vibration waveform collection unit 18. In the expression (4), "N" indicates the number of samples of a vibration waveform on which the Fourier transform is performed.

Based on the expression (3) and the expression (4), in the case where the vibration frequency f of the rope 6 is high, the measurement resolution of the Fourier transform is higher than the measurement resolution of the autocorrelation function when a vibration frequency is obtained, that is, the value of $\Delta f/f$ of the Fourier transform is smaller than the value of $\Delta f/f$ of the autocorrelation function. In the case where the vibration frequency f is low, the measurement resolution of the autocorrelation function is higher than the measurement resolution of the Fourier transform when a vibration frequency is obtained, that is, the value of $\Delta f/f$ of the autocorrelation function is smaller than the value of $\Delta f/f$ of the Fourier transform. A graph in FIG. 21 shows such characteristics. Based on the expression (3) and the expression (4), a point of intersection between the resolution characteristic curve of the Fourier transform and the resolution characteristic curve of the autocorrelation function is determined by the collection time period and the collection cycles for collecting a vibration waveform by the vibration waveform collection unit 18, that is, N number of samples and a sampling frequency fs. A frequency at the point of intersection between the characteristic curves is referred to as "switching frequency" in this embodiment. The frequency calculation unit 21 calculates, from the expression (3) and the expression (4), a switching frequency A based on which the Fourier transform or the autocorrelation function is selectively used.

In obtaining the frequency of the vibration waveform, collected by the vibration waveform collection unit 18, from the spectrum of the frequency calculated by the Fourier transform, the frequency calculation unit 21 searches for the peak of the spectrum of the frequency only in the vicinity of the frequency calculated from the autocorrelation function.

The frequency calculation unit 21 judges, based on the calculated frequency, the sufficiency of the collection time period for collecting the vibration waveform by the vibration waveform collection unit 18. When the frequency calculation unit 21 judges that the collection time period for collecting the vibration waveform by the vibration waveform collection unit 18 is insufficient, the frequency calculation unit 21 outputs no information on the calculated frequency.

Next, a curve interpolation method will be described with reference to FIG. 22.

Figure 22:
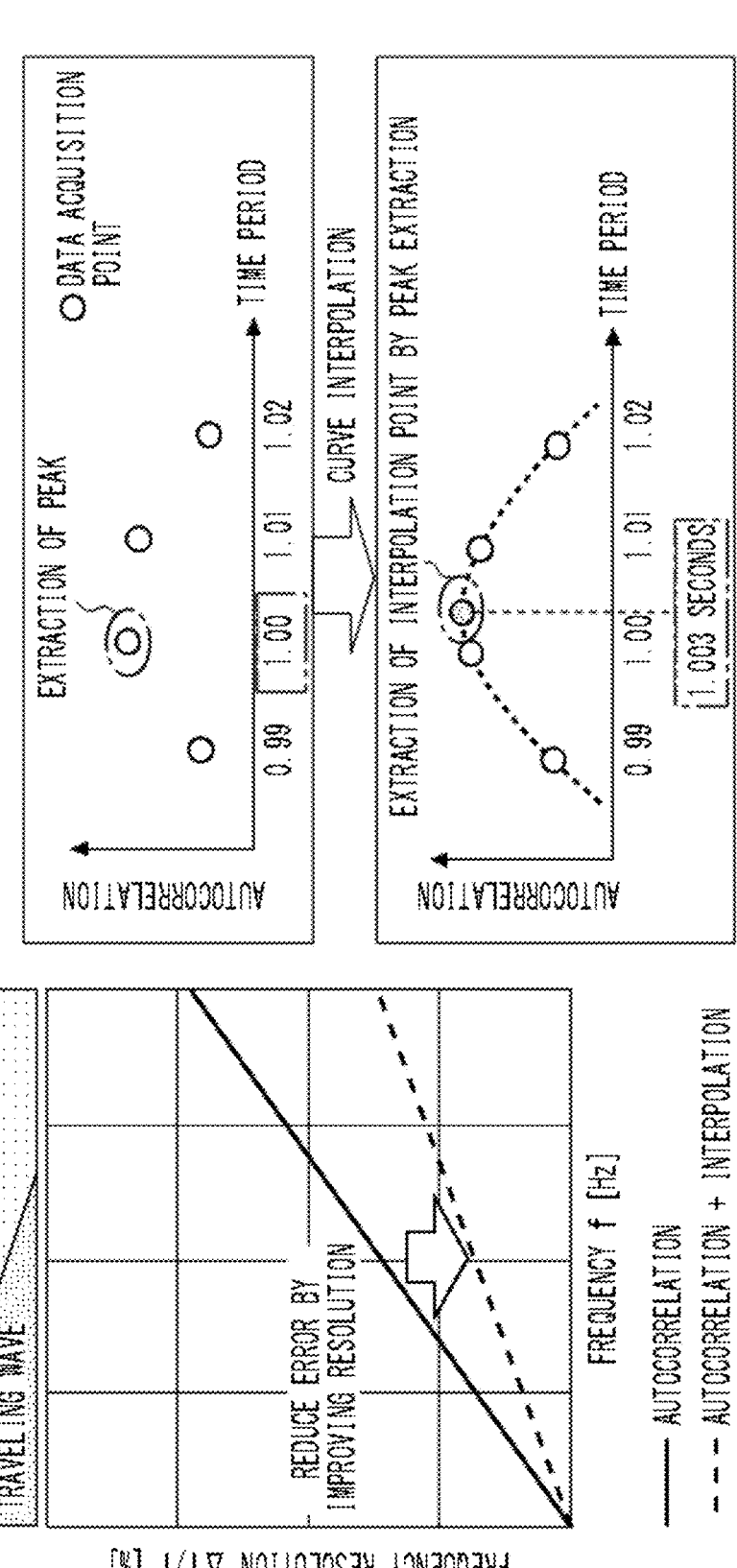
FIG. 22 is a graph for describing a curve interpolation method performed by the rope tension measurement device utilized in the elevator rope tension measurement system according to the embodiment 1.

FIG. 22 is a graph for describing the curve interpolation method performed by the rope tension measurement device utilized in the elevator rope tension measurement system according to the embodiment 1.

In calculating the frequency of the vibration waveform collected by the vibration waveform collection unit 18, the frequency calculation unit 21 performs numerical interpolation in the vicinity of the peak of the frequency to obtain the position of the peak.

Specifically, in calculating a frequency by using the autocorrelation function on a traveling wave, the higher frequencies cause resolution to deteriorate more, thus increasing measurement error. Therefore, the frequency calculation unit 21 reduces measurement error by increasing resolution in a pseudo manner by performing curve interpolation on the autocorrelation function.

Next, the outline of actions of the rope tension measurement device 14 will be described with reference to FIG. 23.

FIG. 23 is a flowchart for describing the outline of the actions of the rope tension measurement device utilized in the elevator rope tension measurement system according to the embodiment 1.

In step S1, the rope tension measurement device 14 performs preprocessing on a vibration waveform that is a measurement target. Thereafter, the action in step S2 is performed. In step S2, the rope tension measurement device 14 calculates the autocorrelation function. Thereafter, the action in step S3 is performed. In step S3, the rope tension measurement device 14 judges whether a frequency estimated from the autocorrelation function is lower than the switching frequency A.

When the frequency estimated from the autocorrelation function is lower than the switching frequency A in step S3, the action in step S4 is performed. In step S4, the rope tension measurement device 14 calculates a frequency from the peak position of the autocorrelation function. Thereafter, the process advances to step S5. In step S5, the rope tension measurement device 14 uses the frequency as a measured value.

When the frequency estimated from the autocorrelation function is not lower than the switching frequency A in step S3, the action in step S6 is performed. In step S6, the rope tension measurement device 14 calculates the Fourier transform. Thereafter, the action in step S7 is performed. In step S7, based on the frequency estimated from the autocorrelation function in step S3, the rope tension measurement device 14 limits a frequency band on which an analysis is made. Thereafter, the action in step S8 is performed. In step S8, the rope tension measurement device 14 judges whether the peak is on the frequency spectrum.

When the peak is not on the frequency spectrum in step S8, the action in step S4 is performed. In step S4, a frequency is calculated from the peak position of the autocorrelation function. Thereafter, the process advances to step S5. In step S5, the rope tension measurement device 14 uses the frequency as a measured value.

When the peak is on the frequency spectrum in step S8, the action in step S9 is performed. In step S9, the rope tension measurement device 14 calculates a frequency from the peak position of the frequency spectrum. Thereafter, the process advances to step S5. In step S5, the rope tension measurement device 14 uses the frequency as a measured value.

Next, a method for adjusting the tension of the rope 6 will be described with reference to FIG. 24.

Figure 24:
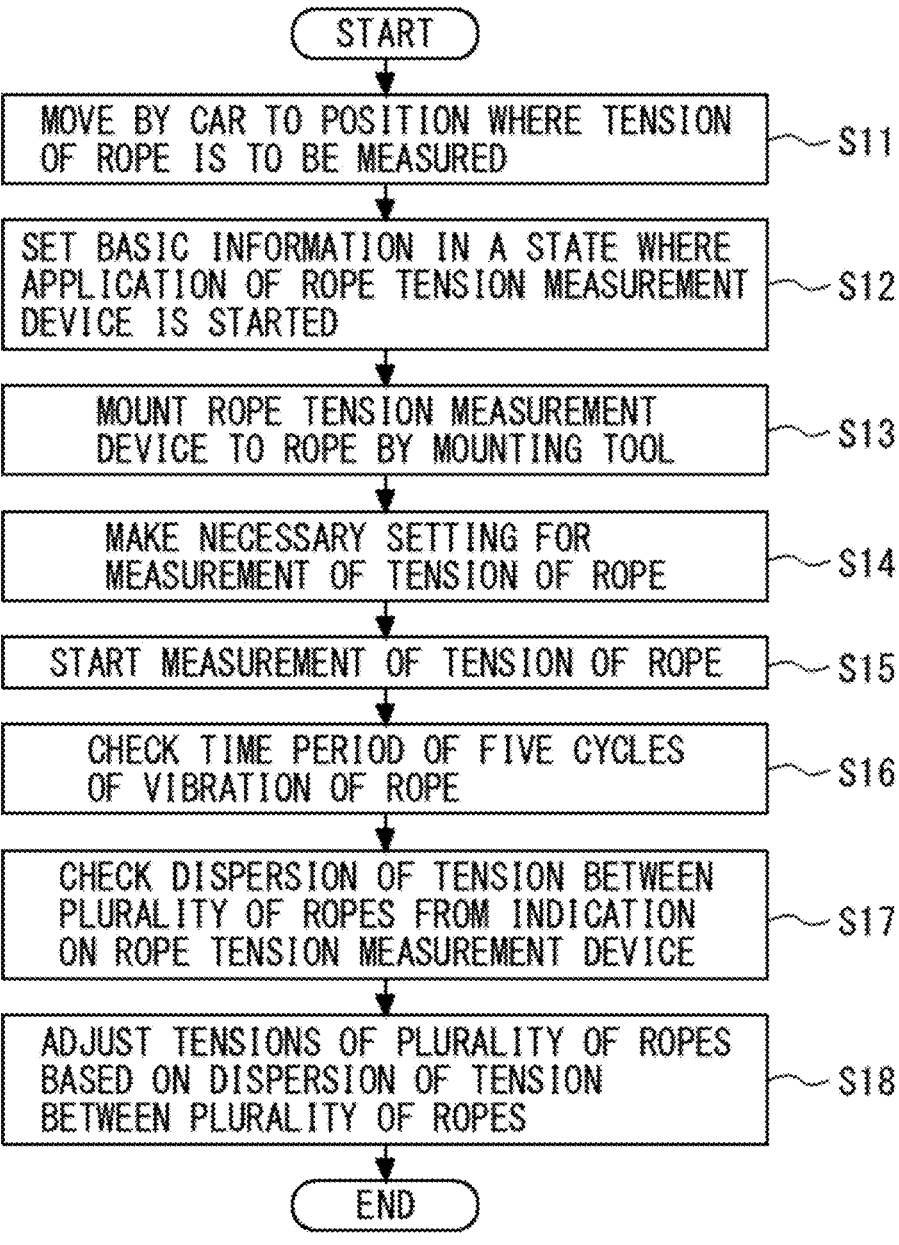
FIG. 24 is a flowchart for describing a method for adjusting the rope by utilizing the elevator rope tension measurement system according to the embodiment 1.

FIG. 24 is a flowchart for describing the method for adjusting a rope by utilizing the elevator rope tension measurement system according to the embodiment 1.

In step S11, a worker moves by the car 9 to a position where the tension of the rope 6 is to be measured. Thereafter, the worker performs the action in step S12. In step S12, the worker sets basic information in a state where the application of the rope tension measurement device 14 is started.

Thereafter, the worker performs the action in step S13. In step S13, the worker attaches the rope tension measurement device 14 to the rope 6 by the attachment jig 15. Thereafter, the worker performs the action in step S14. In step S14, the worker makes necessary settings for the measurement of the tension of the rope 6. Thereafter, the worker performs the action in step S15. In step S15, the worker starts the measurement of the tension of the rope 6. Thereafter, the worker performs the action in step S16. In step S16, the worker checks a time period of five cycles of the vibration of the rope 6. The actions in step S13 to step S16 are repeated by the number of times corresponding to the number of ropes 6.

In step S17, the worker checks dispersion of tension between the plurality of ropes 6 from an indication on the rope tension measurement device 14. Thereafter, the worker performs the action in step S18. In step S18, the worker adjusts the tensions of the plurality of ropes 6 based on the dispersion of tension between the plurality of ropes 6. Thereafter, the worker finishes the operation of adjusting the tensions of the plurality of ropes 6.

According to the embodiment 1 described above, the rope tension measurement device 14 selects a method for calculating the frequency of the vibration waveform of the rope 6 based on the measurement resolution calculated from the collection time period and collection cycles for collecting a vibration waveform of the rope 6. Therefore, it is possible to reduce measurement error when the tension of the rope 6 is quantitatively measured.

The rope tension measurement device 14 calculates the frequency of the vibration waveform of the rope 6 based on the calculation results of the autocorrelation function and the Fourier transform of the vibration waveform of the rope 6. Therefore, it is possible to calculate both the frequency of a standing wave and the frequency of a traveling wave.

As a method for calculating a frequency, other method may be adopted, such as the short-time Fourier transform or the wavelet transform.

Based on information on the height of the hoistway 1 or the length of the rope 6 that is externally inputted, the rope tension measurement device 14 sets a time period for collecting the vibration waveform of the rope 6. Therefore, it is possible to efficiently perform an operation in measuring the tension of the rope 6.

In calculating the frequency of the vibration waveform of the rope 6, the rope tension measurement device 14 performs numerical value interpolation in the vicinity of the peak of the frequency to calculate the position of the peak. Therefore, it is possible to improve resolution in calculating the frequency.

In obtaining the frequency of the vibration waveform of the rope 6 from the spectrum of the frequency calculated by the Fourier transform, the rope tension measurement device 14 searches for the peak of the spectrum of the frequency only in the vicinity of the frequency obtained from the autocorrelation function. Therefore, it is possible to prevent higher harmonics from being erroneously outputted as the measured value of the frequency.

When the rope tension measurement device 14 judges that the collection time period for collecting the vibration waveform of the rope 6 is insufficient, the rope tension measurement device 14 does not output information on the calculated frequency. Therefore, it is possible to ensure frequency measurement accuracy particularly for a low frequency.

The rope tension measurement device 14 performs resampling processing on the vibration waveform of the rope 6. Therefore, even in the case where sampling intervals for sampling the vibration waveform of the rope 6 have dispersion, it is possible to correct the sampling intervals to equal intervals. As a result, it is possible to measure the tension of the rope 6 with high accuracy.

The rope tension measurement device 14 receives an external input operation, and indicates the calculated frequency by a character or an image. Therefore, the rope tension measurement device 14 can be intuitively operated.

The rope tension measurement device 14 stores information on the calculation results for the plurality of ropes 6 of the elevator. Therefore, it is possible to check the dispersion of tension between the plurality of ropes 6 by the rope tension measurement device 14.

The rope tension measurement device 14 extracts the ropes 6 for which the tension is outside of designated values. Therefore, it is possible to start adjustment from the rope 6 having the largest dispersion of tension.

The rope tension measurement device 14 calculates the adjustment amount for the rope 6 for which the tension is outside of the designated values. Therefore, it is possible to easily understand a fastening amount of the shackle nut of the rope 6. As a result, it is possible to finish the adjustment of the rope 6 more quickly.

The housing unit 25 houses the vibration waveform collection unit 18, the frequency calculation unit 21, the touch panel unit 16, the storage unit 17, the extraction unit 22, and the adjustment amount calculation unit 23. Therefore, it is possible to measure the tension of the rope 6 only with the rope tension measurement device 14.

The battery unit 24 is housed in the housing unit 25. The battery unit 24 supplies power to the respective units housed in the housing unit 25. Therefore, it is unnecessary to connect a power supply line to the rope tension measurement device 14. As a result, the operation procedure in measuring the tension of the rope 6 is simplified and hence, work efficiency of the worker can be improved.

The judgement unit 20 judges whether the tension of the rope 6 can be measured based on acceleration detection accuracy. At this point of operation, it is sufficient to indicate information showing the judgement result on the touch panel unit 16, serving as an indication unit, by a character or an image. In this case, it is possible to easily understand whether the specs of the rope tension measurement device 14 are sufficient for the measurement of the tension of the rope 6.

Based on product information on the rope tension measurement device 14, information on the operating system installed in the rope tension measurement device 14, and information on the acceleration sensor serving as the acceleration detection unit, the judgement unit 20 may extract a group of model numbers of the rope tension measurement devices 14 that is allowed to use in measuring the tension of the rope 6. In this case, it is possible to reduce labor necessary for selecting the rope tension measurement device 14.

The judgement unit 20 also judges whether the tension of the rope 6 can be measured based on a difference between collected acceleration and gravitational acceleration. Therefore, it is possible to more easily understand whether the specs of the measurement device are sufficient for the measurement of the tension of the rope 6.

The judgement unit 20 also judges whether the tension of the rope 6 can be measured based on the variance of collected acceleration. Therefore, it is possible to more easily understand whether dispersion of output from the vibration waveform collection unit 18 is sufficient for the measurement of the tension of the rope 6.

The judgement unit 20 also judges whether the tension of the rope 6 can be measured based on the maximum value of the absolute difference between the average values of accelerations for each time. Therefore, it is possible to more easily understand whether repeating error of the vibration waveform collection unit 18 is sufficiently small for the measurement of the tension of the rope 6.

The vibration waveform collection unit 18 calculates the component of gravitational acceleration based on an angle detected by the angle detection unit 26. Therefore, even in the case where the rope tension measurement device 14 is mounted in an arbitrary direction, it is possible to calculate accuracy of output from the vibration waveform collection unit 18.

The judgement unit 20 may judge the specs of the rope tension measurement device 14 based on the cumulative number of times of measurement of the tension of the rope 6. For example, when the cumulative number of times of use is zero and it is judged that the rope tension measurement device 14 is not allowed to use in measuring the tension of the rope 6, it is sufficient to judge that the specs of the rope tension measurement device 14 are insufficient for the measurement of the tension of the rope 6. In this case, it is possible to more easily understand whether the specs of the rope tension measurement device 14 are sufficient for the measurement of the tension of the rope 6.

The storage device 27 receives, from the rope tension measurement device 14, product information from which the acceleration detection unit can be identified and information on the spec judgement result. Then, the storage device 27 stores the product information and the information on the spec judgement result in an associated manner. Therefore, it is possible to automatically obtain a table showing a group of models of the rope tension measurement devices 14 with specs allowing to use for measurement for the measurement of the tension of the rope 6.

The judgement unit 20 may judge whether the tension of the rope 6 can be measured based on a combination of the difference between acceleration and gravitational acceleration for each time, the variance of acceleration for each time, and the maximum value of the absolute difference between the average values of accelerations for each time. In this case, it is possible to more accurately understand whether the specs of the measurement device are sufficient for the measurement of the tension of the rope 6.

In the attachment jig 15, the connecting body 30 connects the grip body 28 with the holder 29 in such a manner that the rope tension measurement device 14 is disposed at a position away from the rope 6. Therefore, it is possible to prevent the rope tension measurement device 14 from interfering with the rope 6 disposed adjacent to the rope 6 that is the measurement target. As a result, it is possible to utilize a mobile terminal, such as an existing smartphone, as the rope tension measurement device 14.

In the attachment jig 15, the holder 29 holds the rope tension measurement device 14 in such a manner that the detection direction of vibration detected by the rope tension measurement device 14 is aligned with the vibration direction of the rope 6. Therefore, it is possible to measure the vibration of the rope 6 with high accuracy.

In the attachment jig 15, the product of a distance between positions where the pair of grip parts 28a hold the rope 6 and a gripping force of the upper grip part 28a for gripping the rope 6 is greater than the rotational moment by the dead load of the rope tension measurement device 14. Therefore, it is possible to prevent the rope tension measurement device 14 from falling due to the rotational moment.

In the attachment jig 15, the connecting body 30 connects the grip body 28 with the holder 29 in such a manner that, when the grip body 28 grips one of the rope 6 on the front side or the rope 6 on the back side, the rope tension measurement device 14 is disposed on a side opposite to the other of the rope 6 on the front side or the rope 6 on the back side with respect to the other of the rope 6 on the front side or the rope 6 on the back side. Therefore, it is possible to prevent the attachment jig 15 from interfering with the rope 6.

In the attachment jig 15, one side of the fall preventing body 31 is connected to the connecting body 30. The other side of the fall preventing body 31 is attached to the rope 6 at a position higher than the rope tension measurement device 14. Therefore, it is possible to prevent the rope tension measurement device 14 from falling.

In the attachment jig 15, the grip body 28 is a clip. Therefore, the attachment jig 15 can be easily mounted on or removed from the rope 6. Further, when the grip body 28 is damaged, the grip body 28 can be easily replaced. It is sufficient to select the grip body 28 corresponding to the outer diameter of the rope 6. Specifically, it is sufficient to select a clip having a curvature conforming to the outer diameter of the rope 6. In this case, the grip body 28 grips the rope 6 with certainty. As a result, it is possible to prevent the rope tension measurement device 14 from being displaced or falling.

In the attachment jig 15, the grip body 28 is a clip having a plurality of curvatures each conforming to the outer diameters of the plurality of ropes 6. In such a case, it is sufficient to grip the rope 6 by a gripping surface with an appropriate curvature corresponding to the outer diameter of the rope 6. In this case, even if the grip body 28 is not replaced corresponding to the outer diameter of the rope 6, it is possible to prevent the rope tension measurement device 14 from being displaced or falling.

In the attachment jig 15, the grip body 28 includes uneven-shaped tips that fit to unevenness on the outer periphery of the rope 6. Therefore, it is possible to prevent the attachment jig 15 from rotating with respect to the rope 6.

In the attachment jig 15, the grip body 28 includes an inner surface portion having protrusions that fit to unevenness on the outer periphery of the rope 6. Therefore, it is possible to prevent the attachment jig 15 from rotating with respect to the rope 6.

In the attachment jig 15, the grip body 28 is formed of a wire member or a plate member having a recess conforming to the outer diameter of the rope 6. Therefore, it is possible to reduce the weight of the attachment jig 15. Further, the attachment jig 15 can be easily mounted on or removed from the rope 6.

In the attachment jig 15, the connecting body 30 has a natural frequency higher than the frequency of the rope 6. Therefore, it is possible to prevent resonance of the rope tension measurement device 14. As a result, it is possible to reduce measurement error of the tension of the rope 6.

In the attachment jig 15, one side of the connecting body 30 is connected with one side of the holder 29. The connecting body 30 is orthogonal to the holder 29. Therefore, the rope tension measurement device 14 is disposed on the one side of the connecting body 30. Therefore, even in the case where the attachment jig 15 is attached to the rope 6 disposed adjacent to the wall of the hoistway 1, it is possible to prevent the rope tension measurement device 14 from interfering with the wall of the hoistway 1. In such a case, when the attachment jig 15 is used in a state of being vertically inverted according to the positional relationship between the rope 6 and the wall of the hoistway 1, the attachment jig 15 can handle both the case where the wall of the hoistway 1 is disposed adjacent to the left side of the rope 6 and the case where the wall of the hoistway 1 is disposed adjacent to the right side of the rope 6.

In the attachment jig 15, the holding part 29a is provided in such a manner that the holding part 29a can be moved in the horizontal direction. The holding part 29a holds the rope tension measurement device 14 from the side. The movable part 29b generates a load in the horizontal direction so as to apply a force of holding the rope tension measurement device 14 to the holding part 29a. Therefore, it is possible to hold the rope tension measurement device 14 with certainty regardless of the size of the rope tension measurement device 14. As a result, even in the case where a mobile terminal, such as an existing smartphone, is utilized as the rope tension measurement device 14, it is possible to hold the mobile terminal with certainty regardless of the kinds of the mobile terminal.

Figure 25:
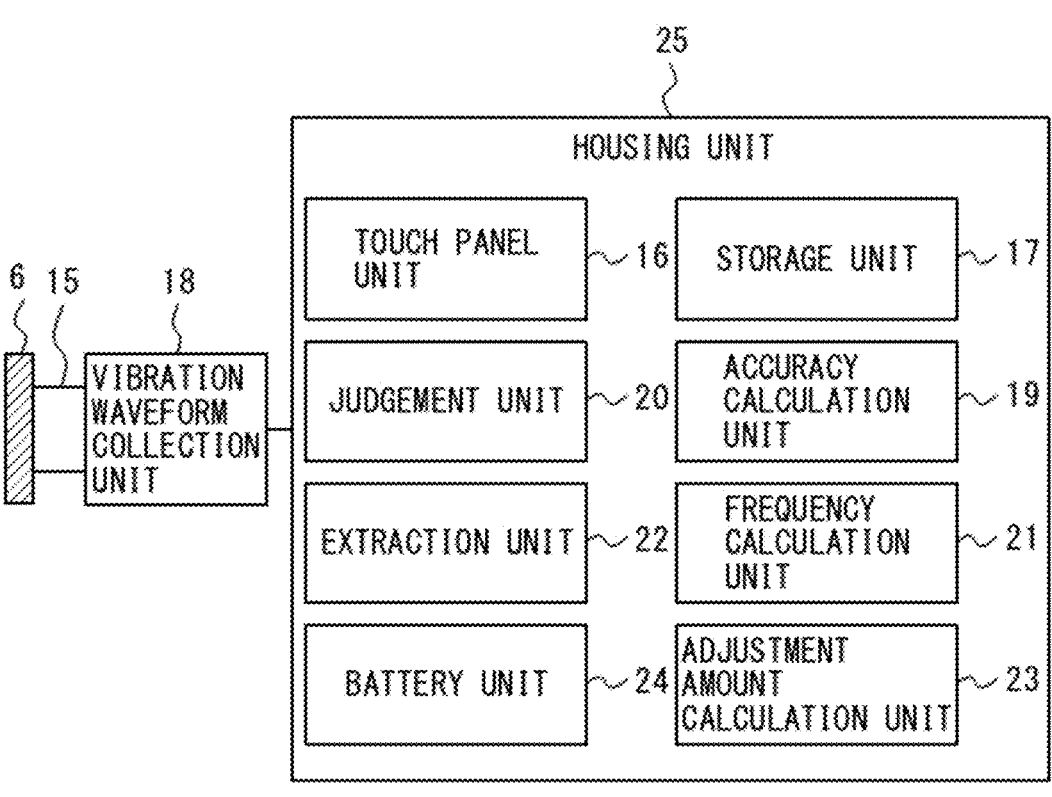
FIG. 25 is a block diagram illustrating a modified example of the elevator rope tension measurement system according to the embodiment 1.

In the embodiment 1, as shown in FIG. 25, a configuration may be adopted where, in the rope tension measurement device 14, the vibration waveform collection unit 18 is not housed in the housing unit 25. The housing unit 25 is connected with the vibration waveform collection unit 18 via a communication cable or the like, the housing unit 25 housing the touch panel unit 16, the storage unit 17, the accuracy calculation unit 19, the judgement unit 20, the frequency calculation unit 21, the extraction unit 22, the adjustment amount calculation unit 23, and the battery unit 24. Therefore, power can be supplied to and obtained waveforms can be communicated to the vibration waveform collection unit 18, for example.

Next, an example of the control device 11 will be described with reference to FIG. 26.

Figure 26:
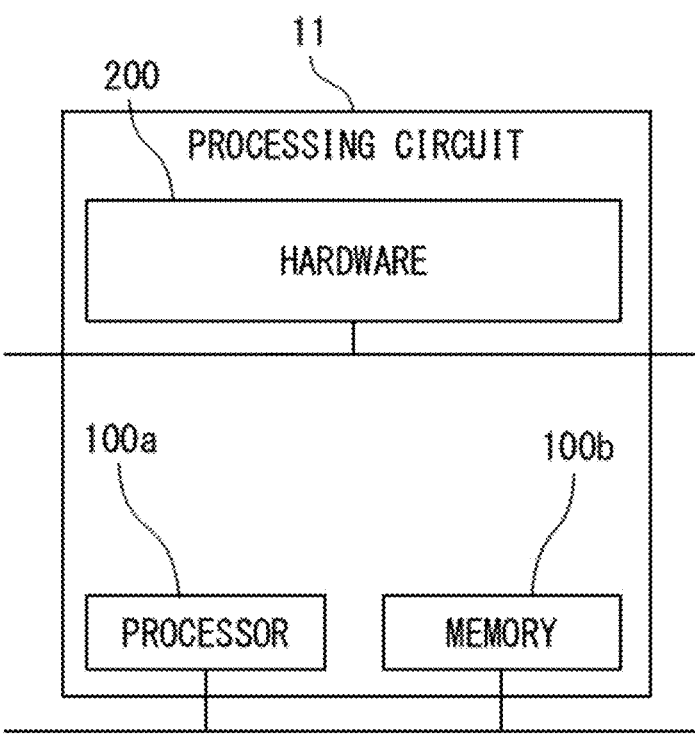
FIG. 26 is a diagram illustrating a hardware configuration of a control device of the elevator system in which the elevator rope tension measurement system according to the embodiment 1 is used.

FIG. 26 is a configuration diagram of hardware of the control device of the elevator system in which the elevator rope tension measurement system according to the embodiment 1 is used.

The respective functions of the control device 11 may be achieved by a processing circuit. For example, the processing circuit includes at least one processor 100a and at least one memory 100b. For example, the processing circuit includes at least one dedicated hardware 200.

In the case where the processing circuit includes at least one processor 100a and at least one memory 100b, the respective functions of the control device 11 are achieved by software, firmware, or a combination of the software and the firmware. At least one of the software and the firmware is referred to as a program. At least one of the software and the firmware is stored in at least one memory 100b. At least one processor 100a reads and executes the program stored in at least one memory 100b to achieve the respective functions of the control device 11. At least one processor 100a is also referred to as a central processing unit, a processing unit, an arithmetic unit, a microprocessor, a microcomputer, or a DSP. For example, at least one memory 100b may be a nonvolatile or volatile semiconductor memory, such as a RAM, a ROM, a flash memory, an EPROM, or an EEPROM, or may be a magnetic disk, a flexible disk, an optical disc, a compact disc, a mini disc, a DVD or the like.

In the case where the processing circuit includes at least one dedicated hardware 200, the processing circuit may be achieved by, for example, a single circuit, a composite circuit, a programmed processor, a parallel programmed processor, an ASIC, an FPGA, or a combination of the above. For example, the respective functions of the control device 11 may be each achieved by the processing circuits. For example, the respective functions of the control device 11 may be collectively achieved by the processing circuit.

Some of the respective functions of the control device 11 may be achieved by the dedicated hardware 200, and other functions may be achieved by the software or the firmware. For example, a part of the function of a control device 11 may be achieved by the processing circuit formed of the dedicated hardware 200, and the other functions may be achieved by at least one processor 100a reading and executing the program stored in at least one memory 100b.

As described above, the processing circuit achieves the respective functions of the control device 11 by the hardware 200, the software, the firmware, or a combination of the above.

Although not shown in the drawing, the respective functions of the monitoring device 12 are also achieved by a processing circuit equivalent to the processing circuit which achieves the respective functions of the control device 11. The respective functions of the information center device 13 are also achieved by a processing circuit equivalent to the processing circuit which achieves the respective functions of the control device 11.

Embodiment 2

Figure 27:
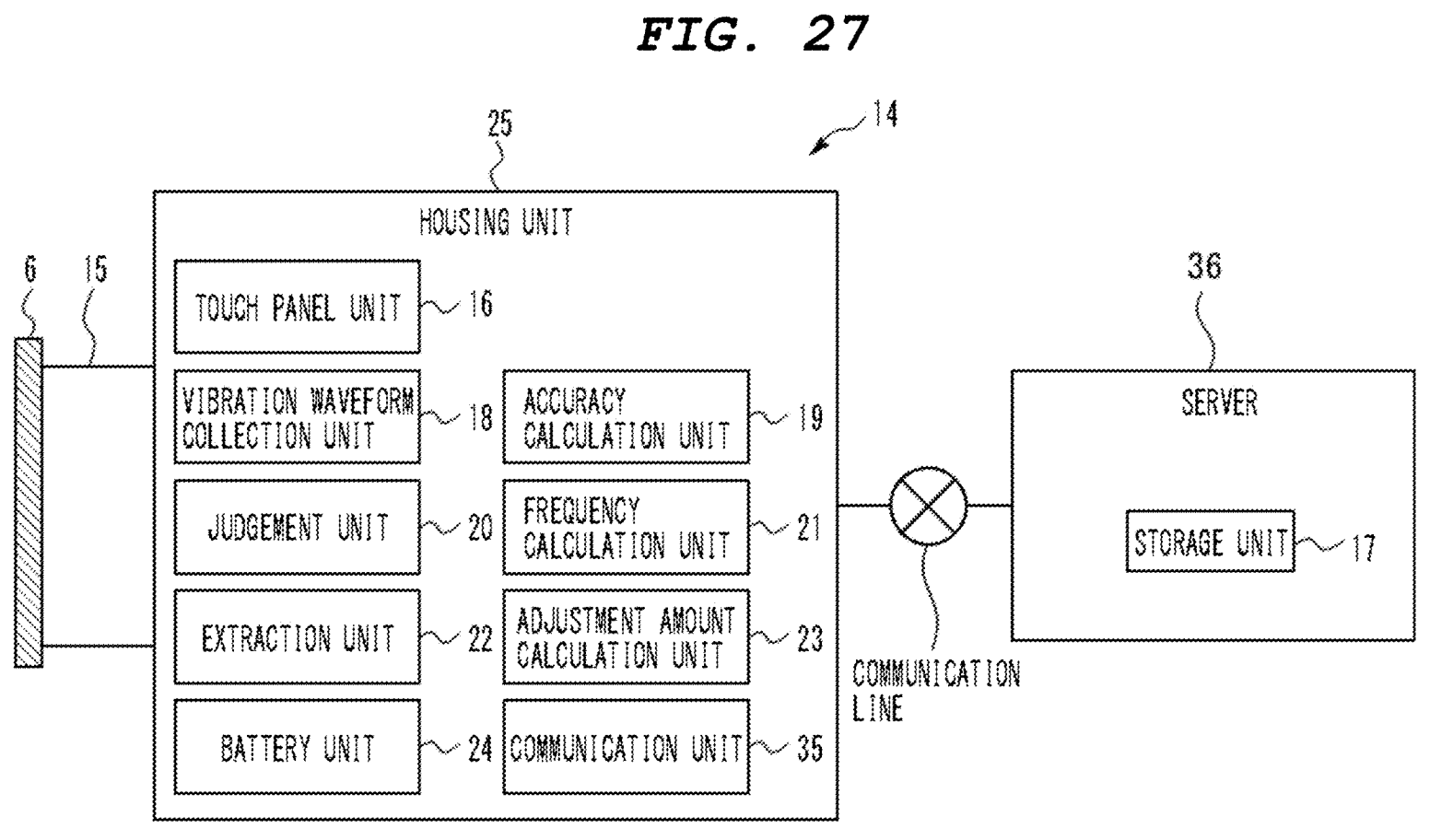

FIG. 27 is a block diagram of an elevator rope tension measurement system of an embodiment 2. Components identical or corresponding to the components in the embodiment 1 are given the same reference symbols. The description of such components will be omitted.

In the embodiment 2, the rope tension measurement device 14 includes a communication unit 35. The communication unit 35 is provided in such a manner that the communication unit 35 can communicate with external equipment. As shown in FIG. 28, the rope tension measurement device 14 may be configured such that the vibration waveform collection unit 18 is not housed in the housing unit 25. Specifically, a structure may be adopted where the vibration waveform collection unit 18 is attached to the rope 6 via the attachment jig 15. The vibration waveform collection unit 18 is connected with the housing unit 25 via a communication cable or the like, the housing unit 25 including the touch panel unit 16, the accuracy calculation unit 19, the judgement unit 20, the frequency calculation unit 21, the extraction unit 22, the adjustment amount calculation unit 23, the battery unit 24, and the communication unit 35. Therefore, power can be supplied to and obtained waveforms can be communicated to the vibration waveform collection unit 18, for example.

A server 36 is provided to the maintenance company or the like for the elevator. The server 36 houses the storage unit 17. The storage unit 17 has a function substantially equal to the function of the storage unit 17 in the embodiment 1.

The rope tension measurement device 14 performs communication with the server 36 via the communication unit 35.

According to the embodiment 2 described above, the server 36 houses the storage unit 17. Each time a rope tension measurement device 14 measures the tension of the rope 6, the storage unit 17 stores the tension measurement result. At this point of operation, if information on the tension measurement result is stored in a state of being associated with measurement time information, it is possible to check the history of dispersion of tension.

Embodiment 3

FIG. 29 is a block diagram of an elevator rope tension measurement system of an embodiment 3. Components identical or corresponding to the components in the embodiment 2 are given the same reference symbols. The description of such components will be omitted.

In the embodiment 3, the server 36 houses the frequency calculation unit 21, the extraction unit 22, and the adjustment amount calculation unit 23. The frequency calculation unit 21, the extraction unit 22, and the adjustment amount calculation unit 23 have functions substantially equal to the functions of the frequency calculation unit 21, the extraction unit 22, and the adjustment amount calculation unit 23 in the embodiment 2. Further, as shown in FIG. 30, the rope tension measurement device 14 may be configured such that the vibration waveform collection unit 18 is not housed in the housing unit 25. Specifically, a structure may be adopted where the vibration waveform collection unit 18 is attached to the rope 6 via the attachment jig 15. The vibration waveform collection unit 18 is connected with the housing unit 25 via a communication cable or the like, the housing unit 25 including the touch panel unit 16, the battery unit 24, and the communication unit 35. Therefore, power can be supplied to and obtained waveforms can be communicated to the vibration waveform collection unit 18, for example.

The rope tension measurement device 14 performs communication with the server 36 via the communication unit 35.

According to the embodiment 3 described above, the server 36 houses the frequency calculation unit 21, the storage unit 17, the extraction unit 22, and the adjustment amount calculation unit 23. Therefore, it is possible to prevent leakage of measurement results for respective premises or algorithms used for analyzing frequencies. Further, when the threshold of an algorithm is changed or updated or a judgement standard is changed, it is unnecessary to update an app in a terminal and hence, updates can be easily made.

Embodiment 4

Figure 31:
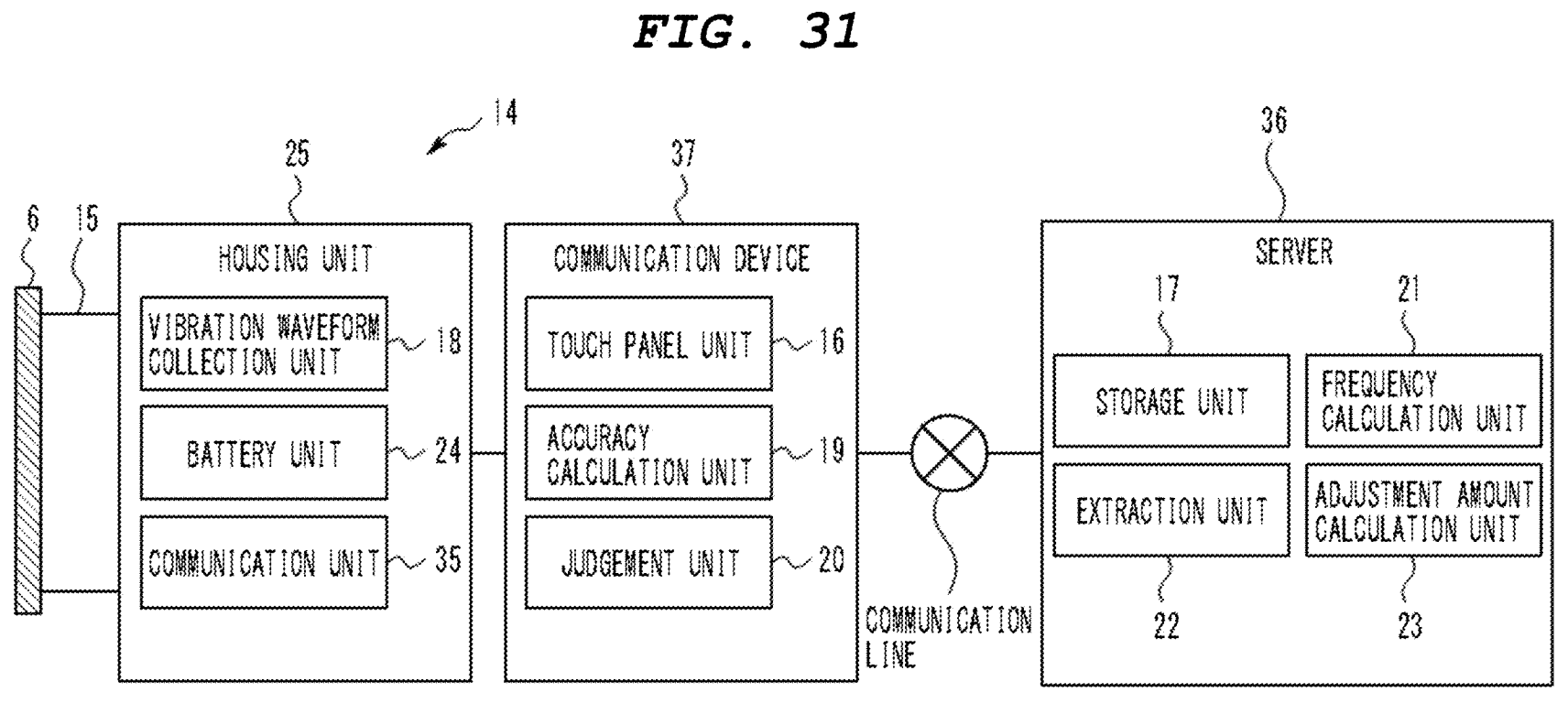

FIG. 31 is a block diagram of an elevator rope tension measurement system of an embodiment 4. Components identical or corresponding to the components in the embodiment 3 are given the same reference symbols. The description of such components will be omitted.

In the embodiment 4, a communication device 37 houses the touch panel unit 16 and the communication unit 35. The touch panel unit 16 and the communication unit 35 have functions substantially equal to the functions of the touch panel unit 16 and the communication unit 35 in the embodiment 3.

The rope tension measurement device 14 performs communication with the communication device 37 via the communication unit 35. The communication device 37 performs communication with the server 36 via a communication line.

Figure 32:
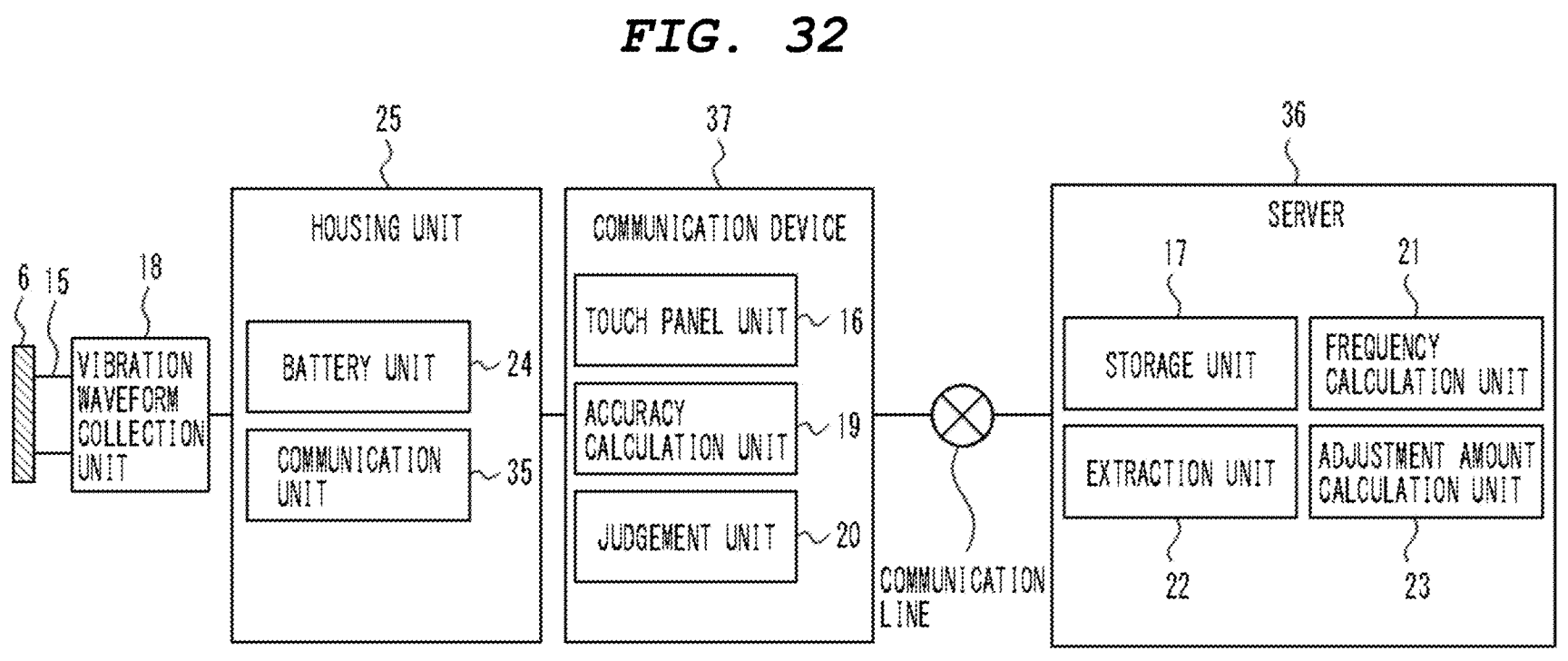

According to the embodiment 4 described above, the housing unit 25 houses the vibration waveform collection unit 18 and the communication unit 35. The communication device 37 houses the touch panel unit 16 and the communication unit 35. Therefore, by selling the vibration waveform collection unit 18 and the attachment jig 15 as an integral body, the rope tension measurement device 14 can be manufactured at a low cost. Further, as shown in FIG. 32, a configuration may be adopted where the vibration waveform collection unit 18 is not housed in the housing unit 25. Specifically, a structure may be adopted where the vibration waveform collection unit 18 is attached to the rope 6 via the attachment jig 15. The vibration waveform collection unit 18 is connected with the housing unit 25 via a communication cable or the like, the housing unit 25 including the battery unit 24 and the communication unit 35. Therefore, power can be supplied to and obtained waveforms can be communicated to the vibration waveform collection unit 18, for example.

In the embodiment 1 to the embodiment 4, a photographing unit and an image processing unit may be provided as the vibration waveform collection unit 18. When such a configuration is adopted, it is sufficient to photograph a vibrating state of the rope 6 with the photographing unit, such as a camera, and to perform processing, by the image processing unit, on an image photographed with the photographing unit. In this case, it is possible to collect a vibration waveform in a non-contact manner with the rope 6.

In the embodiment 1 to the embodiment 4, a sound, a displacement gauge, an velocimeter, a magnetic sensor or the like may be used as the vibration waveform collection unit 18. In this case, compared with the case where the rope 6 is photographed with a camera from a distant position, it is possible to easily perceive the rope 6 that is the measurement target.

In the embodiment 1 to the embodiment 4, arrangement of the traction machine 3, the control device 11, and the monitoring device 12 is not limited. For example, the traction machine 3, the control device 11, and the monitoring device 12 may be disposed at the upper portion of the hoistway 1. For example, the traction machine 3, the control device 11, and the monitoring device 12 may be disposed in a machine room provided immediately above the hoistway 1.

The rope tension measurement system according to any one of the embodiment 1 to the embodiment 4 may be utilized in measuring vibrations of a building facility other than an elevator. For example, the rope tension measurement device 14 of the rope tension measurement system according to any one of the embodiment 1 to the embodiment 4 may be utilized as a vibration measurement device for a building facility in measuring vibrations of an escalator. For example, the rope tension measurement device 14 of the rope tension measurement system according to any one of the embodiment 1 to the embodiment 4 may be utilized as a vibration measurement device for a building facility in measuring vibrations of a moving walk. For example, the rope tension measurement device 14 of the rope tension measurement system according to any one of the embodiment 1 to the embodiment 4 may be utilized as a vibration measurement device for a building facility in measuring vibrations of an air conditioner.

INDUSTRIAL APPLICABILITY

As described above, the building facility vibration measurement device according to the present invention can be utilized for a building facility.

The invention claimed is:

1. A building facility vibration measurement device configured to measure vibration of a building facility, the building facility vibration measurement device comprising:
an acceleration detector configured to detect acceleration; and
a processing circuit configured to:

collect the acceleration detected by the acceleration detector;
calculate detection accuracy of the acceleration from information on the acceleration collected in a state where the acceleration detector is at a standstill so as to detect gravitational acceleration;
judge, based on the detection accuracy, whether the building facility vibration measurement device is allowed to use for measuring vibration of a building facility;
based on product information on the building facility vibration measurement device, information on an operating system installed in the building facility vibration measurement device, and information on an acceleration sensor serving as the acceleration detector, extract a group of model numbers of a building facility vibration measurement device which is allowed to use in measuring a tension of a rope of an elevator serving as the building facility; and
measure the tension of the rope of the elevator using an allowed building facility vibration measurement device.

2. The building facility vibration measurement device according to claim 1, wherein the processing circuit is configured to:
collect the acceleration which is detected by the acceleration detector in a state where the acceleration detector is at a standstill so as to cause an axial direction of the acceleration detector in measuring a tension of a rope of an elevator to be aligned with a direction of gravitational acceleration,
calculate the detection accuracy, including calculating a difference between the gravitational acceleration and the collected acceleration, and
based on the calculated difference, judge whether the building facility vibration measurement device is allowed to use in measuring the tension of the rope.

3. The building facility vibration measurement device according to claim 1, wherein the processing circuit is configured to:
collect the detected acceleration which is detected by the acceleration detector in a state where the acceleration detector is at a standstill so as to cause an axial direction of the acceleration detector in measuring the tension of the rope of the elevator, to be aligned with a direction of gravitational acceleration,
calculate a variance of the collected acceleration, and
based on the calculated variance, judge whether the building facility vibration measurement device is allowed to use in measuring the tension of the rope.

4. The building facility vibration measurement device according to claim 1, wherein the processing circuit is configured to:
collect the acceleration a plurality of number of times, the acceleration being detected by the acceleration detector in a state where the acceleration detector is at a standstill so as to cause an axial direction of the acceleration detector in measuring the tension of the rope of the elevator, to be aligned with a direction of gravitational acceleration,
calculate the detection accuracy, including calculating an average value of the collected accelerations for each time and a maximum value of an absolute difference between average values for each time, and based on the calculated maximum value, judge whether the building facility vibration measurement device is allowed to use in measuring the tension of the rope.

5. The building facility vibration measurement device according to claim 1, wherein the processing circuit is configured to:

collect the acceleration a plurality of number of times, the acceleration being detected by the acceleration detector in a state where the acceleration detector is at a standstill so as to cause an axial direction of the acceleration detector in measuring the tension of the rope of the elevator, to be aligned with a direction of gravitational acceleration, calculate the detection accuracy, including calculating a difference between the gravitational acceleration and the collected acceleration for each time, a variance of the collected acceleration for each time, and a maximum value of an absolute difference between average values of the collected accelerations for each time, and based on a combination of the difference, the variance, and the maximum value, judge whether the building facility vibration measurement device is allowed to use in measuring the tension of the rope.

6. The building facility vibration measurement device according to claim 1, comprising:

an angle detector configured to detect an angle with respect to an axis forming a reference, wherein the processing circuit is configured to, based on the angle detected by the angle detector, calculate a component of the gravitational acceleration from the acceleration detected by the acceleration detector.

7. The building facility vibration measurement device according to claim 1, wherein the processing circuit is configured to judge a spec of the building facility vibration measurement device based on a cumulative number of times of the measurement of the vibration of the building facility.

8. A building facility management system comprising a storage medium device configured to:

receive, from the building facility vibration measurement device according to claim 1, product information from which the acceleration detector is capable of being identified and information on a spec judgement result; and store the product information and the information on the spec judgement result in an associated manner.

9. A building facility vibration measurement device configured to measure vibration of a building facility, the building facility vibration measurement device comprising:

an acceleration detector configured to detect acceleration; and a processing circuit configured to:

collect the acceleration detected by the acceleration detector;

calculate a variance of the collected acceleration from information on the acceleration collected in a state where the acceleration detector is at a standstill so as to detect gravitational acceleration;

collect the detected acceleration which is detected by the acceleration detector in the state where the acceleration detector is at the standstill so as to cause an axial direction of the acceleration detector in measuring a tension of a rope of an elevator, to be aligned with a direction of gravitational acceleration, the elevator serving as the building facility; and based on the calculated variance, judge whether the building facility vibration measurement device is allowed to use in measuring the tension of the rope, wherein, responsive to judging that the building facility vibration measurement device is allowed to use, the processing circuit is configured to measure the tension of the rope of the elevator using the building facility vibration measurement device.

10. A building facility vibration measurement device configured to measure vibration of a building facility, the building facility vibration measurement device comprising:

an acceleration detector configured to detect acceleration; and a processing circuit configured to:

collect the acceleration detected by the acceleration detector;

collect the acceleration a plurality of number of times, the acceleration being detected by the acceleration detector in a state where the acceleration detector is at a standstill so as to cause an axial direction of the acceleration detector in measuring a tension of a rope of an elevator, to be aligned with a direction of gravitational acceleration, the elevator serving as the building facility;

calculate an average value of the collected acceleration for each time and a maximum value of an absolute difference between average values for each time; and based on the calculated maximum value, judge whether the building facility vibration measurement device is allowed to use in measuring the tension of the rope, wherein, responsive to judging that the building facility vibration measurement device is allowed to use, the processing circuit is configured to measure the tension of the rope of the elevator using the building facility vibration measurement device.

* * * * *